United States Patent
Noguchi et al.

(10) Patent No.: US 8,237,984 B2
(45) Date of Patent: Aug. 7, 2012

(54) PROCESSOR, METHOD, AND PROGRAM FOR PROCESSING DATA USING A MASK PATTERN WITH PRINT PERMISSION PARTS ARRANGED AT A DISTANCE OF CORRESPONDING INTEGRAL MULTIPLE AREAS

(75) Inventors: Eri Noguchi, Yokohama (JP); Yoshitomo Marumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/081,800

(22) Filed: Apr. 7, 2011

(65) Prior Publication Data

US 2011/0181897 A1    Jul. 28, 2011

Related U.S. Application Data

(62) Division of application No. 11/696,959, filed on Apr. 5, 2007, now Pat. No. 7,948,652.

(30) Foreign Application Priority Data

Apr. 11, 2006 (JP) ................................ 2006-108905

(51) Int. Cl.
*H04N 1/405* (2006.01)
*H04N 1/52* (2006.01)
*G06K 15/10* (2006.01)
*B41J 2/205* (2006.01)
*B41J 2/21* (2006.01)

(52) U.S. Cl. ........ 358/1.8; 358/3.06; 358/502; 358/535; 347/12; 347/15

(58) Field of Classification Search ................... 358/1.9, 358/1.8, 3.06, 3.13, 3.18, 3.19, 3.26, 502, 358/534, 535; 347/9, 12, 15, 40, 43
See application file for complete search history.

(56) References Cited

U.S. PATENT DOCUMENTS

| 4,967,203 A | 10/1990 | Doan et al. |
| 5,594,478 A | 1/1997 | Matsubara et al. |
| 5,604,520 A | 2/1997 | Matsubara et al. |
| 5,633,663 A | 5/1997 | Matsubara et al. |

(Continued)

FOREIGN PATENT DOCUMENTS

JP        5-31922 A    2/1993

(Continued)

OTHER PUBLICATIONS

Theophano Mitsa et al., "Digital Halftoning Using a Blue Noise Mask", Image Processing Algorithms and Techniques II, vol. 1452, pp. 47-56 (1991).

*Primary Examiner* — Scott A Rogers
(74) *Attorney, Agent, or Firm* — Fitzpatrick, Cella, Harper & Scinto

(57) ABSTRACT

Provided are a data processing method and a data processor for ink jet printing, which are capable of achieving uniform and high-quality images while stabilizing density and color development in each of pixels. To this end, a mask pattern for setting permission and non-permission to print dots in each area is arranged non-periodically by using an integral multiple of m×n areas as one unit. The m×n areas allow one pixel to be expressed in half-tone. Thereby, density in the pixel is stable since a plurality of dots printed in the same pixel are printed approximately in the same event. Moreover, since each of the units (clusters) is non-periodically arranged, a uniform image can be obtained.

13 Claims, 18 Drawing Sheets

U.S. PATENT DOCUMENTS

| | | |
|---|---|---|
| 5,818,474 A | 10/1998 | Takahashi et al. |
| 5,831,642 A | 11/1998 | Matsubara et al. |
| 6,042,212 A | 3/2000 | Takahashi et al. |
| 6,130,685 A | 10/2000 | Matsubara et al. |
| 6,183,055 B1 | 2/2001 | Kanematsu et al. |
| 6,203,133 B1 | 3/2001 | Tanaka et al. |
| 6,250,737 B1 | 6/2001 | Matsubara et al. |
| 6,315,391 B1 | 11/2001 | Kanematsu |
| 6,601,939 B2 | 8/2003 | Fujita et al. |
| 6,779,873 B2 * | 8/2004 | Maeda et al. ............ 347/43 |
| 7,130,083 B1 | 10/2006 | Konno et al. |
| 7,258,412 B2 * | 8/2007 | Maru et al. ............ 347/15 |
| 7,303,247 B2 | 12/2007 | Maru et al. |
| 7,316,473 B2 | 1/2008 | Matsuzawa et al. |
| 7,469,985 B2 | 12/2008 | Noguchi et al. |
| 7,506,945 B2 | 3/2009 | Noguchi |
| 7,506,950 B2 | 3/2009 | Noguchi et al. |
| 7,914,102 B2 * | 3/2011 | Imai ............ 347/15 |
| 2007/0097164 A1 | 5/2007 | Marumoto |
| 2007/0109604 A1 | 5/2007 | Marumoto |
| 2007/0216724 A1 | 9/2007 | Shibata et al. |
| 2007/0285450 A1 | 12/2007 | Noguchi |
| 2009/0086231 A1 | 4/2009 | Marumoto |
| 2009/0161131 A1 | 6/2009 | Fujimoto et al. |

FOREIGN PATENT DOCUMENTS

| | | |
|---|---|---|
| JP | 6-22106 A | 1/1994 |
| JP | 7-52390 A | 2/1995 |
| JP | 9-46522 A | 2/1997 |
| JP | 2001-54956 A | 2/2001 |
| JP | 2002-144552 A | 5/2002 |
| JP | 2006-44258 A | 2/2006 |

* cited by examiner

HEAD SCANNING
DIRECTION

PROCESSOR, METHOD, AND PROGRAM FOR PROCESSING DATA USING A MASK PATTERN WITH PRINT PERMISSION PARTS ARRANGED AT A DISTANCE OF CORRESPONDING INTEGRAL MULTIPLE AREAS

The present application is a divisional of U.S. patent application Ser. No. 11/696,959 filed Apr.5, 2007, the entire disclosure of which is incorporated by reference herein.

BACKGROUND OF THE INVENTION

1. Field of the Invention

The present invention relates to a data processor and a data processing method. More particularly, the present invention relates to a data processing method and a data processor, characterized by a relationship between a dot arrangement pattern which forms an image, and a mask pattern for printing the image by dividing the pattern into several numbers of times.

2. Description of the Related Art

Along with the recent proliferation of information processing devices such as personal computers, a printing apparatus as an image formation terminal has also been rapidly developed and widely used. Particularly, among various printing apparatuses, an ink jet printing apparatus, which performs printing on various printing media by ejecting ink as droplets, can carry out a high-density and high-speed printing operation with low noise. Moreover, color printing can be easily handled with the ink jet printing apparatus, and the device is inexpensive. As described above, since the ink jet printing apparatus has many excellent features, the apparatus has now become a mainstream of printing apparatuses for personal use.

Advancement in an ink jet printing technology facilitates higher-quality printing at higher speed and lower costs, and significantly contributes to the effect of making the printing apparatuses popular among personal users, in combination with widely-used personal computers, digital cameras and the like. However, due to such popularity of the printing apparatuses, the personal users desire for further improvement in image quality produced with the printing apparatuses. Particularly, demanded recently are a print system which allows easy printing of photographs at home, and image quality equivalent to that of silver-halide photography.

However, due to its manufacturing processes, slight variations inevitably occur, among a plurality of nozzles in an ink jet printing head, in a direction of ejecting ink and in the amount of ink. Moreover, in a serial type printing apparatus, the amount of sub-scanning (paper feeding) performed between each of printing scans includes some structural errors. Such errors and variations cause adverse effects on images, such as stripes and density unevenness, on a printing medium onto which the ink is applied.

In order to avoid such adverse effects on images, a printing method known as multi-pass printing is often adopted in a serial type ink jet printing apparatus.

FIG. 1 is a schematic view of a printing head and a printing pattern for explaining the multi-pass printing. Reference numeral 1001 denotes a printing head. Here, for simplicity, the printing head is supposed to have 16 nozzles. As shown in FIG. 1, the nozzles are divided into four groups, first to fourth, and each of the groups includes four nozzles. Reference numeral 1002 denotes a mask pattern in which areas that can be printed with the respective nozzles (print permission pixels) are shown in black. Patterns to be printed with the respective nozzle groups are in a completing relationship with each other. These patterns are superimposed on one another to complete printing in a region corresponding to 4×4 areas.

Patterns denoted respectively by reference numerals 1003 to 1006 show how an image is completed by repeating printing scans. Every time each of the printing scans is completed, a printing medium is carried by a width of each nozzle group in a direction indicated by the arrow in FIG. 1. Accordingly, in the same region (a region corresponding to the width of each nozzle group) of the printing medium, the image is completed with four printing scans.

By adopting the multi-pass printing as described above, the adverse effects on images, such as aforementioned stripes and density unevenness, can be reduced. This is because, even if there is a variation in ejection characteristics of the respective nozzles or in a transfer amount, these characteristics are widely dispersed to make the variation less noticeable.

By using FIG. 1, the description has been given by taking, as an example, four-pass printing in which four printing scans are performed for the same image region. However, the multi-pass printing is not limited to the above case. It is also possible to adopt two-pass printing for completing an image with two printing scans, or to adopt a configuration for completing an image with five or more printing scans. The larger the number of passes is, the more widely the variation in the ejection characteristics of the respective nozzles or in the transfer amount is dispersed. Thus, a smoother image can be obtained.

In order for the multi-pass printing to sufficiently achieve the foregoing effects, predetermined conditions are required between a dot arrangement pattern and mask pattern of an image, particularly, in a halftone.

FIG. 2 is a view for explaining the foregoing conditions. In FIG. 2, reference numeral 2001 denotes dot data given to a region of 4 areas×8 areas. In this dot data, black areas show areas where dots are printed, and white areas show areas where dots are not printed. Reference numerals 2002 and 2003 denote two kinds of mask patterns in a completing relationship with each other. The two kinds of mask patterns are applied to the image region described above. Here, reference numeral 2002 denotes the mask pattern to be used for a first printing scan, and reference numeral 2003 denotes the mask pattern to be used for a second printing scan. In the mask patterns, a black area indicates an area in which a dot is allowed to be printed in a printing scan (hereinafter also referred to as a "print permission area"), and a white area indicates an area in which a dot is not allowed to be printed (hereinafter also referred to as a "print non-permission area"). The areas in which printing is actually performed in each of the printing scans are obtained by a logical product (AND operation) of the dot data 2001 and the mask pattern 2002 or the mask pattern 2003. Reference numerals 2004 and 2005 show the results thereof. Here, the areas in which the printing is actually performed in each of the printing scans are shown in black, and the areas in which no printing is performed are shown in white. As is clear from FIG. 2, in this example, a significant difference is caused in the number of areas, in which the printing is actually performed, between the first printing scan and the second printing scan. Specifically, ejection characteristics of nozzles used in the first printing scan have a significant influence on an image. As a result, it is hard to achieve the effects of the multi-pass printing.

For the above reason, in order to sufficiently achieve the effects of the multi-pass printing, it is necessary to print approximately the same number of dots in each of a plurality of printing scans performed for the same image region. This is because, if the number of dots to be printed drastically varies from scan to scan, the variation in the ejection characteristics of the respective nozzles or in the transfer amount is not dispersed. For this reason, adverse effects on images, such as stripes and density unevenness, are not reduced.

Here, the description has been given by using the pattern 2001 as an example. Meanwhile, dot data to be printed undergoes diverse changes according to a gradation value and a pulse-surface-area modulation (a quantization method) to be adopted. In consideration of such circumstances, there has already been disclosed a technology of preparing a mask pattern not synchronous with the pulse-surface-area modulation adopted in the multi-pass printing (see Japanese Patent Laid-Open No. H5-31922).

There has also been disclosed a technology and a method for generating a mask pattern in which print permission areas and print non-permission areas are randomly arranged, as a mask pattern which satisfies the foregoing conditions as much as possible regardless of inputted image data with any gradation by use of any pulse-surface-area modulation (see, for example, Japanese Patent Laid-Open No. H7-52390).

Furthermore, in the multi-pass printing, various mechanical problems unique to a printing apparatus can be prevented from appearing on images by further contriving arrangement of the mask pattern while giving consideration to the foregoing conditions.

For example, Japanese Patent Laid-Open No. 2002-144552 discloses a method for applying a mask pattern which has excellent dispersion properties and suppressed low-frequency components. In the multi-pass printing, if a printing position of one printing scan is shifted from other printing scan, a design (texture) of an employed mask pattern is made visible. Even in such a case, by adopting the method disclosed in Japanese Patent Laid-Open No. 2002-144552, a mask pattern itself, which has excellent dispersion properties, and of which appearance is favorable, is made less obtrusive, in other words, less visible. Thus, there is hardly any influence on image quality.

Meanwhile, as to what is termed as binarization processing for converting multi-level gradation data, which indicates density of an image to be printed, into dot data indicating whether or not each of ink droplets is printed on a printing medium, many methods have already been proposed and disclosed. Basically, any one of the methods can be adopted. However, in recent years when a printing resolution of a printing apparatus and the number of ink colors are being increased, it may be too heavy a burden to perform entire image processing of all colors at the same resolution as the printing resolution. For this reason, for example, the following printing system has been recently provided. Specifically, after a host device performs main image processing at a resolution lower than a printing resolution, quantization processing is performed for reducing the number of levels in the gradation value of each pixel to the several levels thereof. Thereafter, final binarization processing is further performed by a printing apparatus. In this case, each pixel outputted by the host device is expressed in gradation with multiple levels of density. Thus, the above system can be considered as being suitable for use that places importance on gradation properties such as photographic image quality.

As to a method for converting several stages of multi-level density data into binary data, some proposals and implementations have already been given. For example, Japanese Patent Laid-Open No. 1997-46522 discloses a method for expressing gradation by printing or not printing four dots within 2×2 areas for one input pixel having five stages of gradation values. Furthermore, the above patent document also discloses a method for preparing a plurality of dot arrangement patterns within 2×2 areas for the same gradation value, and then by sequentially or randomly arranging these dot arrangement patterns. By use of the above method, the dot arrangement pattern for each stage of gradation is not fixed. Thus, a pseudo contour appeared when pseudo halftone processing is performed, what is termed as a "sweeping phenomenon," which appears on an edge of an image, and the like are reduced. Moreover, the above patent document describes that the above method has an effect of averaging use of a plurality of printing elements arranged in a printing head. As described above, the method for converting the data of the several stages of multi-level density that the low-resolution pixel has, into high-resolution binary data is an effective technology for an ink jet printing apparatus which prints minute dots at a high definition. Such a processing method will be hereinafter referred to as dot arrangement patterning processing in the present specification.

As described above, in the recent ink jet printing system, high-quality output images equivalent even to the photographic image quality are achieved by using a random mask pattern and a mask pattern having high dispersion properties, while utilizing the dot arrangement patterning processing.

However, the random mask pattern and the mask pattern having high dispersion properties, which have heretofore been generally used, are not created by giving due consideration to characteristics of output data from the dot arrangement patterning processing used in the same printing system. The output data from the dot arrangement patterning processing has several gradation levels. The gradation levels are expressed with combinations of areas where dots are printed and areas where dots are not printed, within m×n areas (one area is a region where one dot is printed). In contrast, in the conventional mask pattern, one area or a plurality of adjacent areas, which are unrelated to the m×n areas, are set as a unit. Then, only randomness and dispersion properties of each unit are taken into consideration. Here, m and n respectively indicate positive integers, and at least one of m and n is an integer of 2 or larger.

In such a case, it is confirmed that interference occurs between a dot arrangement pattern, in which areas for printing or not printing dots are regularly set within a relatively narrow range, and a mask pattern having irregularity within a wider range than that of dot arrangement pattern. To be more specific, when the multi-pass printing is performed, a situation occurs where in some pixels formed in m×n areas all dots are printed at once, and in other pixels all dots are printed by separately several times.

A known phenomenon is that, even in a case where the same number of dots of the same ink color are printed for expressing the same hue in two pixels, a difference occurs in color development and density of the two pixels when the number of scans required for printing (the time required for completing printing) varies between the two pixels. Specifically, in the conventional combination of the dot arrangement patterning processing and the mask patterns, the number of times that dots within each pixel are printed, and the timings at which the dots are printed are different among the pixels. For this reason, color development and density in each of the pixels is unstable.

SUMMARY OF THE INVENTION

The present invention has been made to solve the aforementioned problems. An object of the present invention is to provide a data processing method and a data processor for ink jet printing capable of achieving uniform and high-quality images, while stabilizing density and color development within each pixel.

The first aspect of the present invention is a data processor which divides first binary data to be printed in one region on a printing medium into second binary data used respectively in a plurality of scans of a printing head, in order to perform printing in the region with the plurality of scans, comprising: means which divides the first binary data obtained by binarization using a dot arrangement pattern formed of m×n areas (m and n indicate positive integers, and at least one of m and n is an integer of 2 or larger) into the second binary data used in each of the plurality of scans, by use of a mask pattern in which print permission areas and print non-permission areas are non-periodically arranged by using an integral multiple of the m×n areas as one unit.

The second aspect of the present invention is a data processing method for dividing first binary data to be printed in one region on a printing medium into second binary data used in each of a plurality of scans of a printing head, in order to perform printing in the same region with the plurality of scans, the method comprising the step of: dividing the first binary data obtained by binarization using a dot arrangement pattern formed of m×n areas (m and n indicate positive integers, and at least one of m and n is an integer of 2 or larger) into the second binary data used in the plurality of scans, by use of a mask pattern in which print permission areas and print non-permission areas are non-periodically arranged by using an integral multiple of the m×n areas as one unit.

The third aspect of the present invention is a program for causing a device to function as a data processor by being read by the device, the data processor dividing first binary data to be printed in one region on a printing medium into second binary data used respectively in a plurality of scans of a printing head in order to perform printing in the region with the plurality of scans, the program comprising: a code for allowing the data processor to carry out processing of dividing the first binary data obtained by binarization using a dot arrangement pattern formed of m×n areas (m and n indicate positive integers, and at least one of m and n is an integer of 2 or larger) into the second binary data used respectively in the plurality of scans, by use of a mask pattern in which print permission areas and print non-permission areas are non-periodically arranged by using an integral multiple of the m×n areas as one unit.

Further features of the present invention will become apparent from the following description of exemplary embodiments (with reference to the attached drawings).

DESCRIPTION OF THE EMBODIMENTS

Embodiments of the present invention will be described in detail below.

(First Embodiment)

Figure 3:
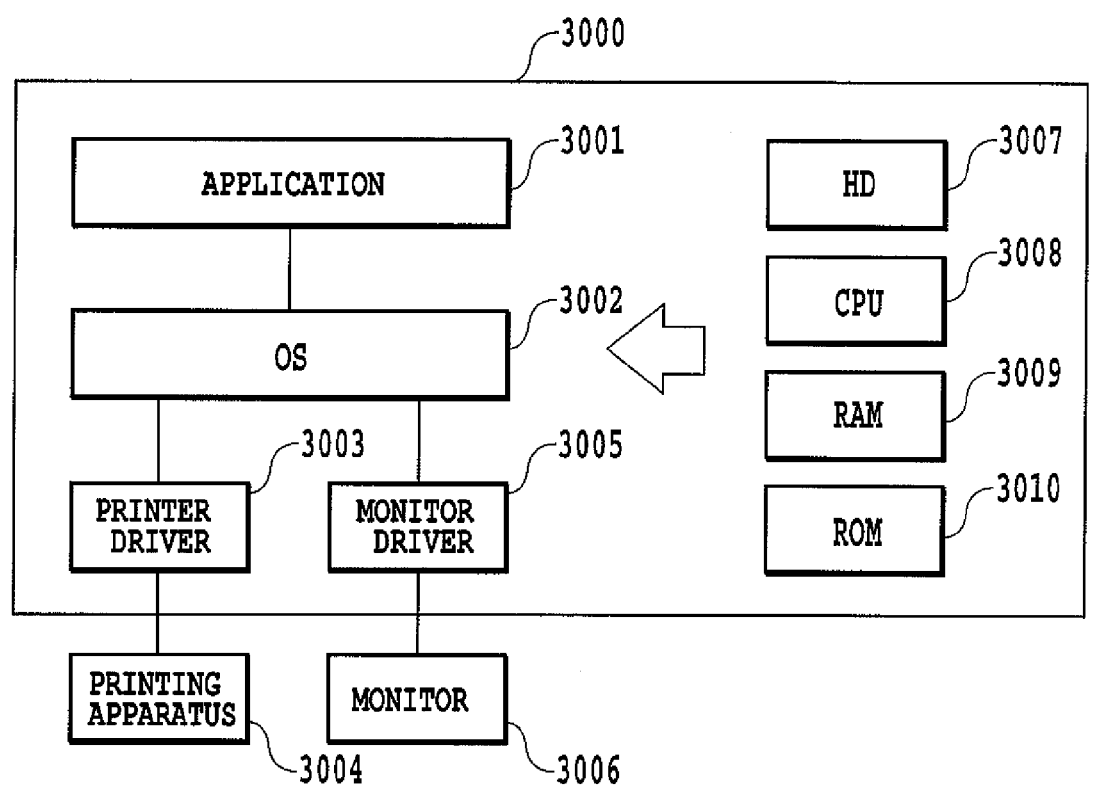
FIG. 3 is a block diagram mainly showing configurations of hardware and software of a personal computer as a data processor according to an embodiment of the present invention.

FIG. 3 is a block diagram mainly showing configurations of hardware and software of a personal computer (hereinafter also simply called a PC) as a data processor according to this embodiment.

In FIG. 3, a host computer PC 3000 uses an operating system (OS) 3002 to operate software including application software 3001, a printer driver 3003 and a monitor driver 3005. The application software 3001 performs generation of images and the like, in addition to processing for word processing, table calculation, Internet browsing and the like. The monitor driver 3005 executes processing for displaying on a monitor 3006 images and the like, which are created by the application software 3001.

The printer driver 3003 processes image data transmitted to the OS 3002 from the application software 3001, and generates binary ejection data which can be printed by a printing apparatus 3004. The ejection data generated in this event are for four colors, cyan (C), magenta (M), yellow (Y) and black (K), which are the types of ink used by the printing apparatus 3004. The image processing executed by the printer driver 3003 will be described in detail later.

The host computer 3000 includes, as hardware for operating the software described above, a CPU 3008, a hard disk (HD) 3007, a RAM 3009, a ROM 3010 and the like. The CPU 3008 executes processing of the software according to programs stored in the ROM 3010. The RAM 3009 is used as a work area for the processing.

Figure 4:
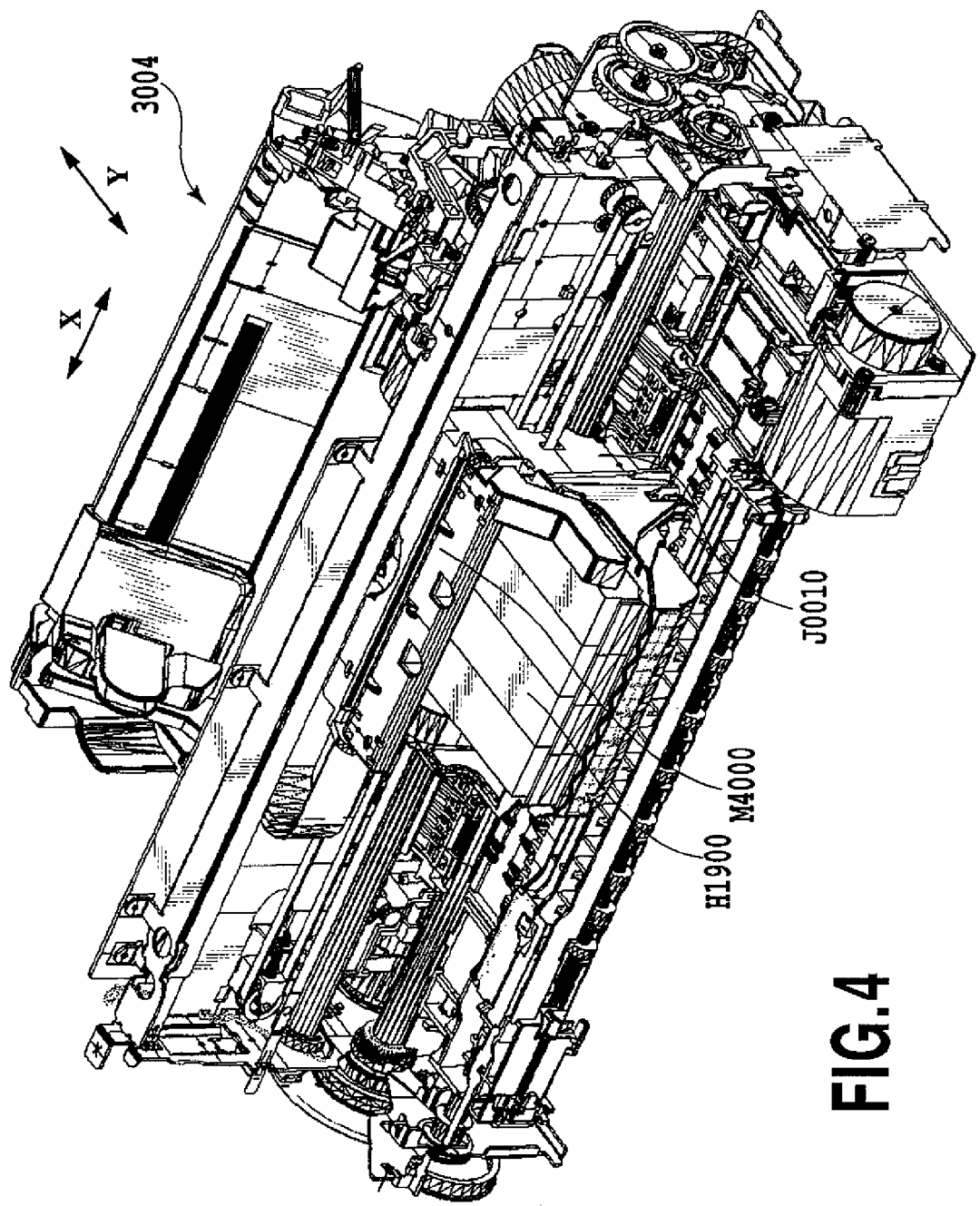
FIG. 4 is a perspective view for explaining a printing apparatus applicable to the present invention.

FIG. 4 is a perspective view showing the printing apparatus 3004. The printing apparatus 3004 in this embodiment is a serial type ink jet printing apparatus, which forms images on a printing medium by use of a printing head J0010 including a plurality of nozzles that eject ink. Ink is supplied to the printing head J0010 from ink tank H1900 which contains cyan (C), magenta (M), yellow (Y) and black (K) ink. A carriage M4000 moves in a direction X (main scanning direction) in FIG. 4, in a state where the printing head J0010 and the ink tank H1900 are mounted thereon. At predetermined timings during the movement of the carriage, each of the nozzles in the printing head J0010 ejects the ink on the basis of the binary ejection data. When one event of main scanning for printing with the printing head J0010 is complete, the printing medium is carried by a predetermined amount in a direction Y (sub-scanning direction) in FIG. 4. By alternately repeating the main scanning and sub-scanning for printing as described above, an image is sequentially formed on the printing medium.

In the printing head J0010 of this embodiment, 128 nozzles for each color are arranged in the sub-scanning direction at a density of 1200 dpi (dot/inch). About 2 picoliters of ink droplets are ejected from each of the nozzles.

Figure 5:
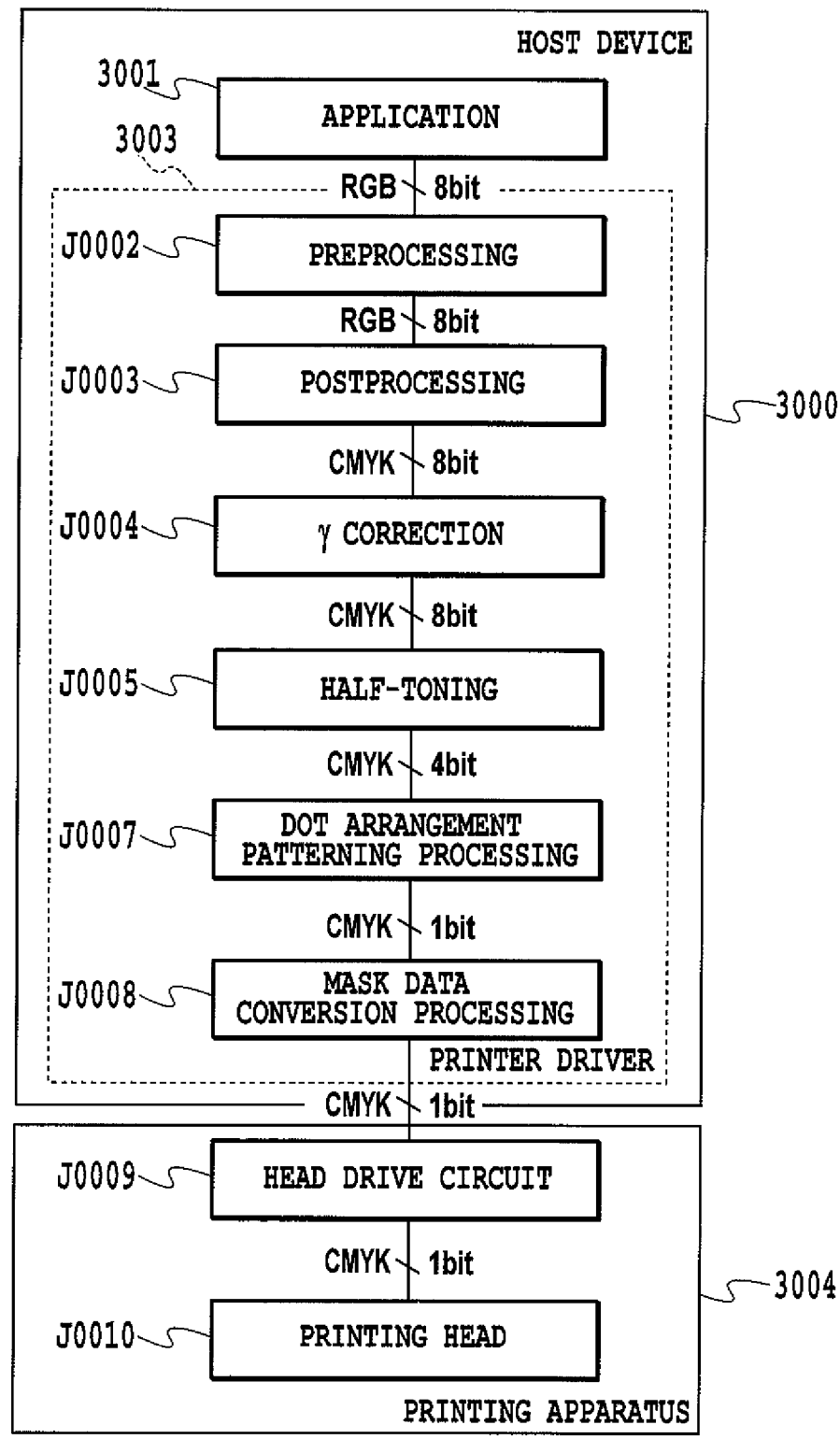
FIG. 5 is a block diagram showing a flow of image processing mainly performed by a host PC.

FIG. 5 is a block diagram for explaining a flow of image processing mainly performed by the host PC 3000. In execution of printing, the image data created with the application 3001 is passed to the printer driver 3003 via the OS 3002. To the received image data, the printer driver 3003 executes preprocessing J0002, postprocessing J0003, γ correction J0004, half-toning J0005, dot arrangement patterning processing J0007 and mask data conversion processing J0008. Each of these processings will be briefly described below.

In the preprocessing J0002, color gamut mapping is performed. This processing is data conversion for mapping color gamut reproduced with image data R, G and B according to the sRGB standard, within color gamut reproduced by the printing apparatus. To be more specific, data of 256 gradations, in which each of R, G and B is expressed by 8 bits, is converted into 8-bit data of R, G and B with different contents by use of a three-dimensional LUT.

In the postprocessing J0003, on the basis of the R, G and B data to which the aforementioned color gamut mapping is performed, color separation data Y, M, C and K corresponding to a combination of types of ink that reproduces colors indicated by the R, G and B data, are obtained. Here, as in the case of the preprocessing, the processing is performed while concurrently using an interpolation operation by use of the three-dimensional LUT.

In the γ correction J0004, conversion is performed on a density value (a gradation value) of the data on each color in the color separation data obtained in the postprocessing J0003. To be more specific, a one-dimensional LUT corresponding to gradation characteristics of the respective types of color ink in the printing apparatus is used to perform such conversion as to allow the aforementioned color separation data to linearly correspond to the gradation characteristics of the printing apparatus.

In the half-toning J0005, the 8-bit color separation data Y, M, C and K are quantized and converted into 4-bit data. In this embodiment, a multi-level error diffusion method is used to convert the 8-bit data of 256 gradations into 4-bit data of 9 gradations. The 4-bit data is gradation value information to be an index for showing a dot arrangement pattern in the subsequent dot arrangement patterning processing.

In the dot arrangement patterning processing J0007 in this embodiment, 4-bit density data having 9 gradations (the levels 0 to 8) is converted into binary pattern data, in which areas for printing or not printing dots are set, by referring to previously stored dot arrangement patterns.

Figure 6:
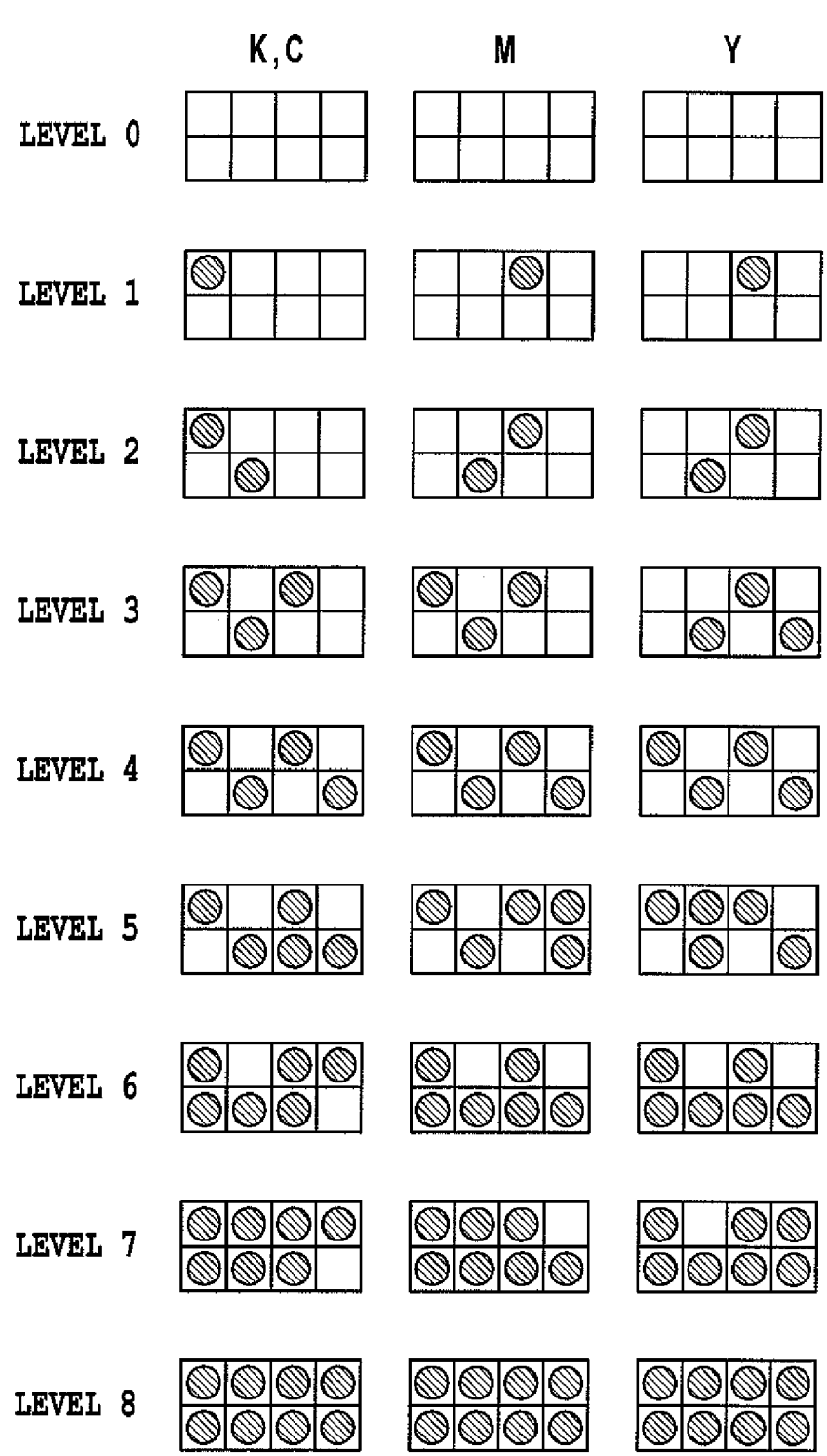
FIG. 6 is a view showing dot arrangement patterns converted for levels 0 to 8, respectively.

FIG. 6 is a view showing dot arrangement patterns converted for the levels 0 to 8, respectively. The level values shown on the left side of FIG. 6 correspond to the respective levels 0 to 8, which are output values from the half-toning processing J0005. Each of regions arranged on the right side, which is formed of 4 areas in width×2 areas in height, corresponds to a region of 1 pixel outputted in the half-toning processing. 1 pixel has a size corresponding to a pixel density of 600 dpi×600 dpi. Each of areas in 1 pixel is equivalent to the minimum unit in which whether or not dots are printed is defined. One area corresponds to a printing density of 1200 dpi (dot/inch) in height×2400 dpi in width. The printing apparatus of this embodiment is designed to be able to print one area defined by about 20 µm in height×about 10 µm in width with 2 pl of one ink droplet for each color. The vertical direction in FIG. 6 is a direction in which ejection ports of the printing head are arranged. An arrangement density of the areas and an arrangement density of the ejection ports coincide with each other having the same value of 1200 dpi. The horizontal direction indicates a scanning direction of the printing head. In this embodiment, the printing apparatus is configured to perform printing with a density of 2400 dpi in the scanning direction. Here, FIG. 6 shows an example where dot arrangement patterns differ among the ink colors even at the same level value. However, the present invention is not limited to the above example, and the same dot arrangement patterns may be used for all the colors. Moreover, it is also possible to adopt a configuration in which a plurality of types of dot arrangement patterns are sequentially or randomly used even at the same level value of the same ink color.

In the dot arrangement patterning processing J0007, whether or not dots are printed is defined for each of the plurality of areas forming 1 pixel as described above. Accordingly, 1-bit ejection data of "1" or "0" is generated for a printing element corresponding to each of the areas or a column to be printed. In FIG. 6, each of the areas with a circle filled therein represents an area in which a dot is printed. As the level is higher, the number of dots printed is increased by one between the levels.

Figure 2:
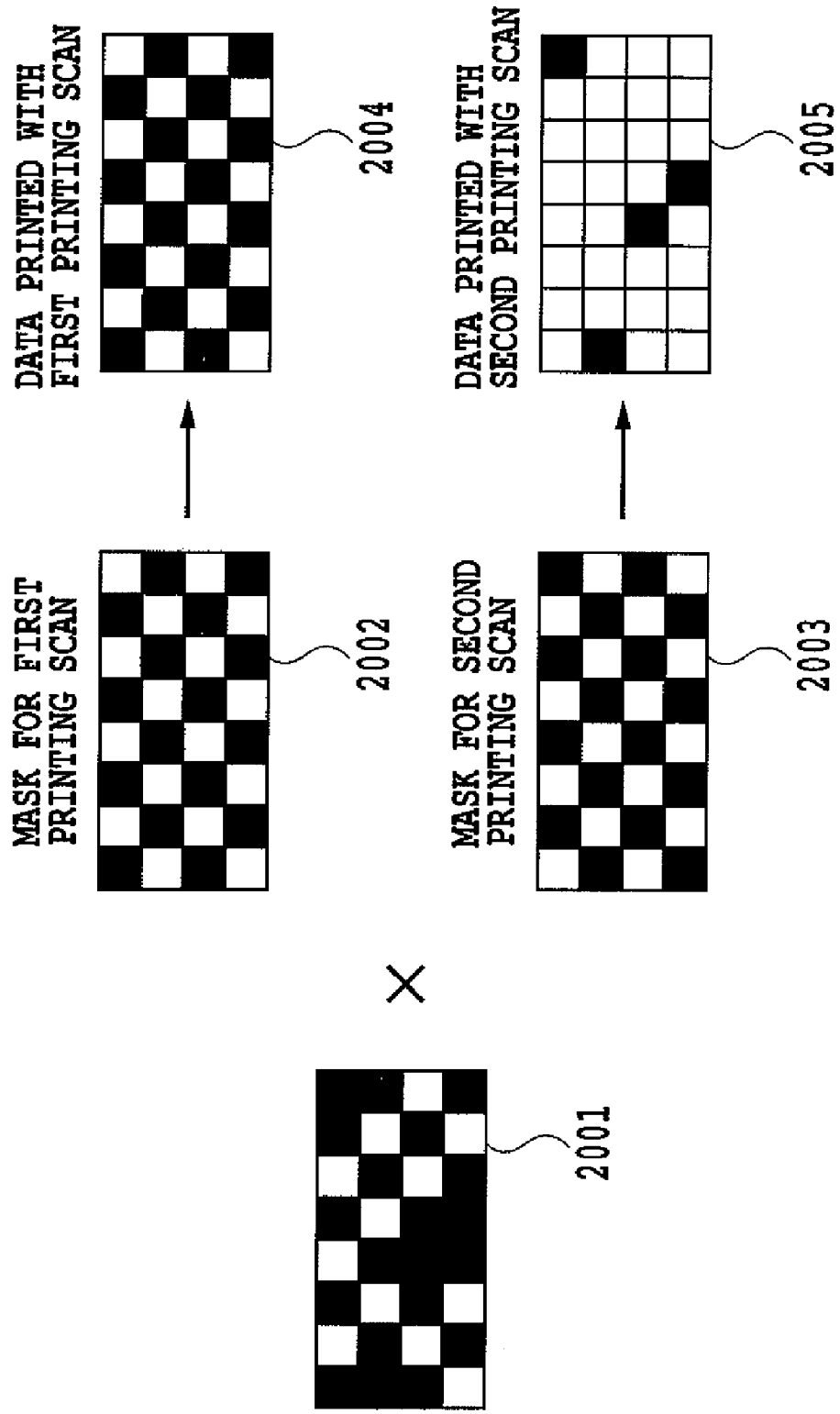
FIG. 2 is a view for explaining conditions on a relationship between dot arrangement and mask patterns in the multi-pass printing.

The binary data outputted from the dot arrangement patterning processing J0007 is subsequently subjected to the mask data conversion processing J0008. In the mask data conversion processing J0008, the dot data of each of the colors, which are determined by the dot arrangement patterning processing J0007, and predetermined mask patterns are ANDed as already described with reference to FIG. 2. In this embodiment, the four-pass printing is supposed to be performed, and the adopted mask patterns have a printing permission rate of 25%. Characteristics of the mask patterns used in this embodiment will be described in detail later. Binary data obtained as a result of ANDing is set to be dot data printed in a subsequent printing scan, and is transferred to the printing apparatus 3004.

In the printing apparatus, the received binary data is transferred to a head drive circuit J0009. The 1-bit data of each color inputted to the drive circuit J0009 is converted into a drive pulse for the printing head J0010. Accordingly, the ink of each color is ejected at predetermined timing from the printing head J0010. Thus, one event of main scanning for printing is executed.

Figure 7:
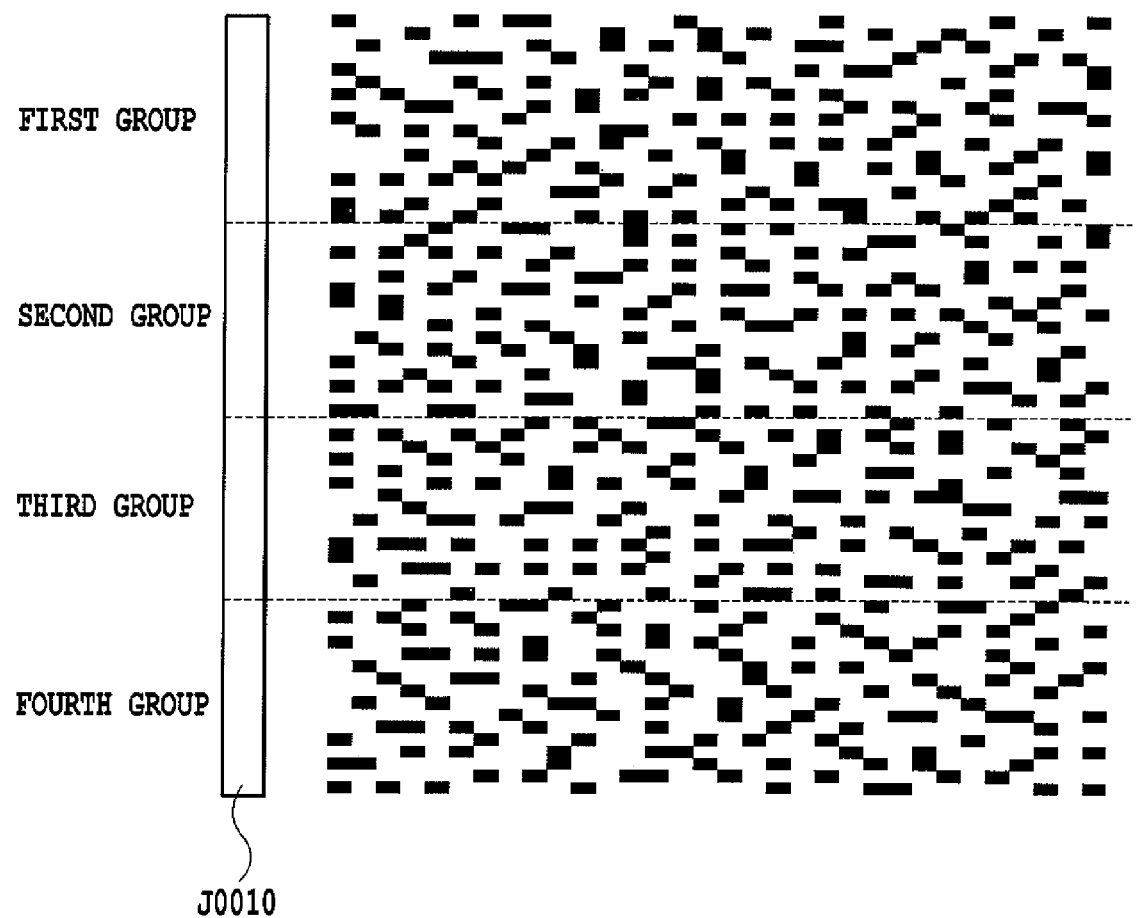
FIG. 7 is a view showing a mask pattern used in a first embodiment of the present invention.

FIG. 7 shows a mask pattern for the four-pass printing applied in this embodiment. This mask pattern is formed of 128 areas in a vertical direction×128 areas in a horizontal direction, and the number of the areas of the vertical direction corresponds to the number of nozzles in the printing head. In a case of the four-pass printing, 128 nozzles arranged in the printing head J0010 can be considered to be divided into four groups, first to fourth groups. Each of the groups includes 32 nozzles. Here, as in the case of FIG. 1, black areas indicate areas in which printing is allowed (print permission areas), and white areas indicate areas in which printing is not allowed (print non-permission areas).

One of the characteristics of the mask pattern in this embodiment is that the minimum unit (hereinafter referred to as a cluster size) for determining permission or non-permission of printing is set to be 1 pixel in the dot arrangement patterning processing, in other words, 4 areas×2 areas. With reference to the drawings, an advantage of setting the cluster size to be a size of 1 pixel will be described below.

Figure 8:
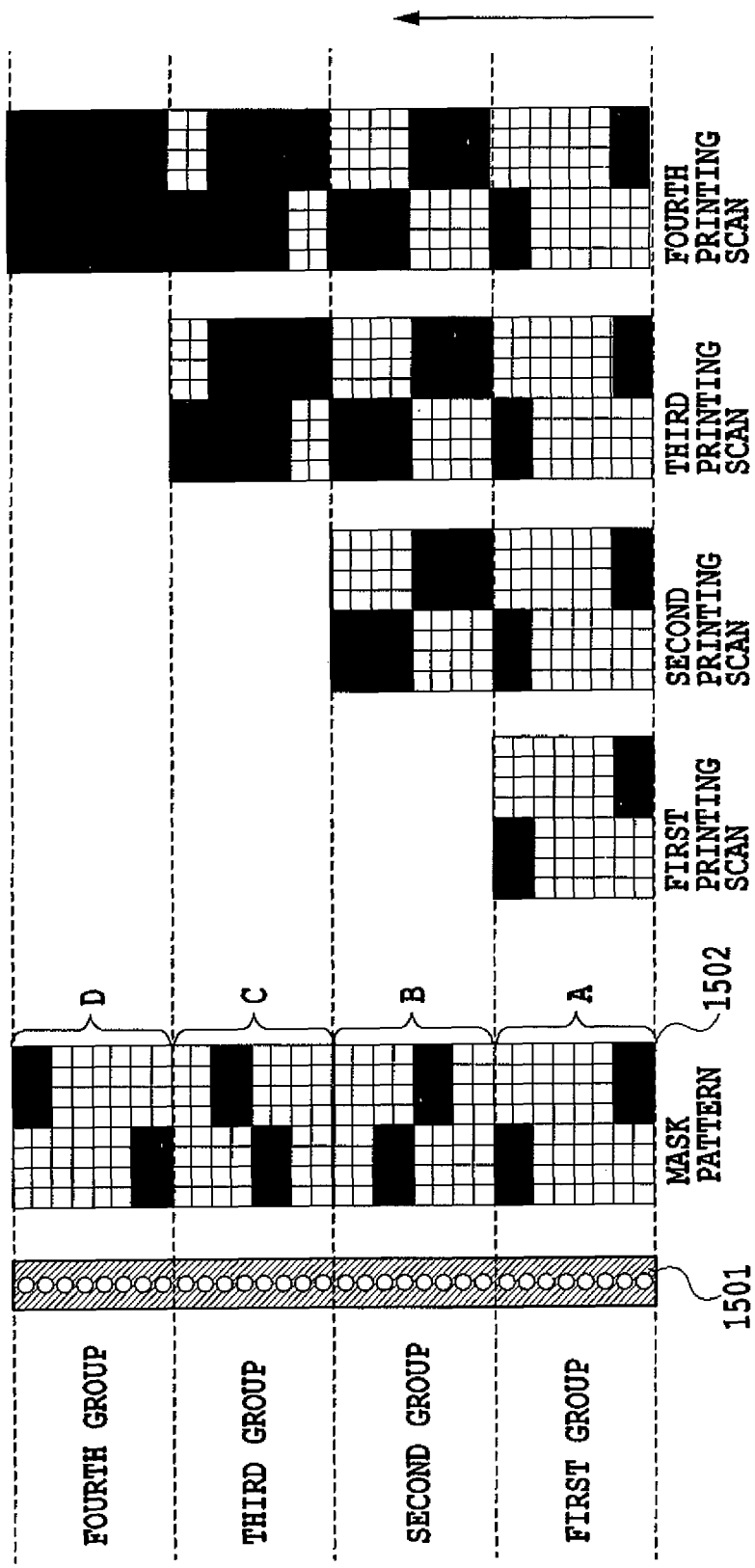
FIG. 8 is a view for explaining a mask pattern in a case where a cluster size is set to be 4 areas×2 areas.

FIG. 8 is a view showing a mask pattern in the case where the cluster size is set at 4 areas×2 areas. Reference numeral 1501 is a printing head for one color. Here, for simplicity, the printing head is supposed to have 32 nozzles. For the four-pass printing, 32 nozzles are divided into four groups, each group having 8 nozzles. Each of the groups corresponds to mask patterns A to D. In the mask patterns A to D, permission (black) and non-permission (white) of printing is defined in each unit of 4 areas×2 areas. Moreover, the mask patterns are kept in a completing relationship with each other. Each of the patterns on the right side shows how an image is completed by repeating printing scans. Every time each of the printing scans is finished, printing of a plurality of pixels is completed by the unit of 1 pixel (in other words, the unit of 4 areas×2 areas). Thereafter, a printing medium is carried by a width of 8 nozzles in a direction indicated by the arrow in FIG. 8. Accordingly, the image is completed with four printing scans in the same region (a region corresponding to each nozzle group) of the printing medium.

Figure 9:
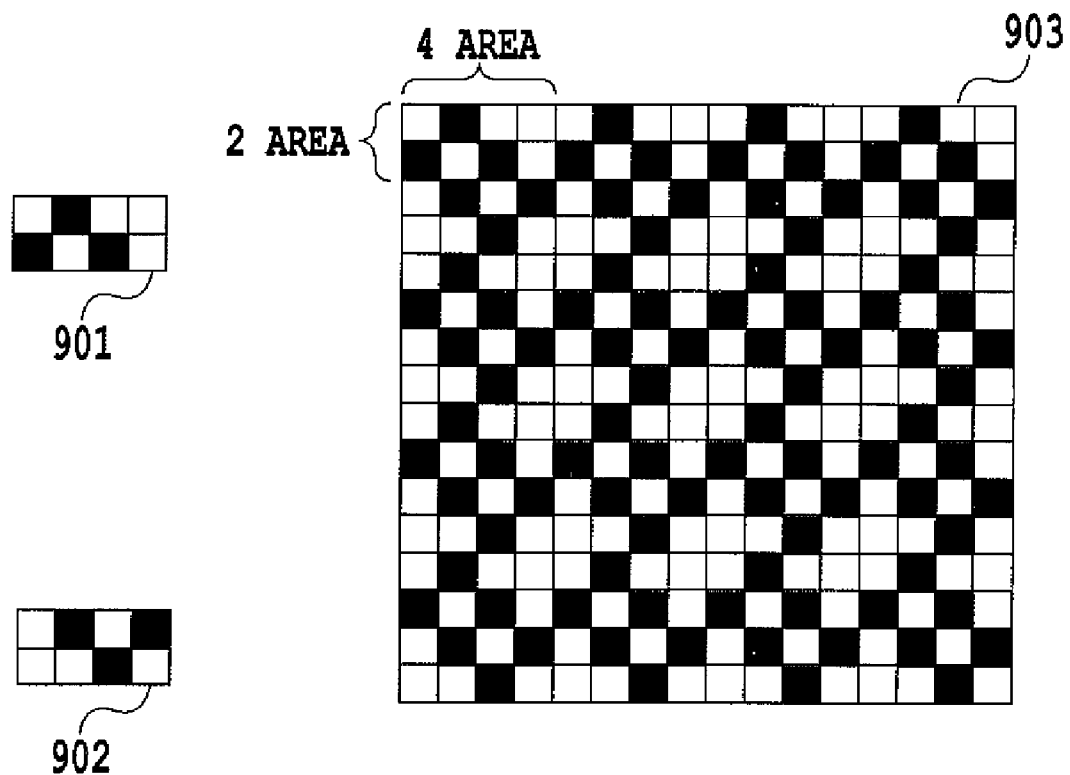
FIG. 9 is a view showing an example of output data in dot arrangement patterning processing.

FIG. 9 is a view showing an example of output data in the dot arrangement patterning processing according to this embodiment. As already described with reference to FIG. 6, in the dot arrangement patterning processing of this embodiment, the prepared dot arrangement patterns are allocated to the respective data of levels 0 to 8. In this example, in a state where input signals of level 3 are uniformly inputted, two kinds of dot arrangement patterns 901 and 902 are used to sequentially in the sub-scanning direction. Reference numeral 903 indicates the obtained dot data.

Figure 1:
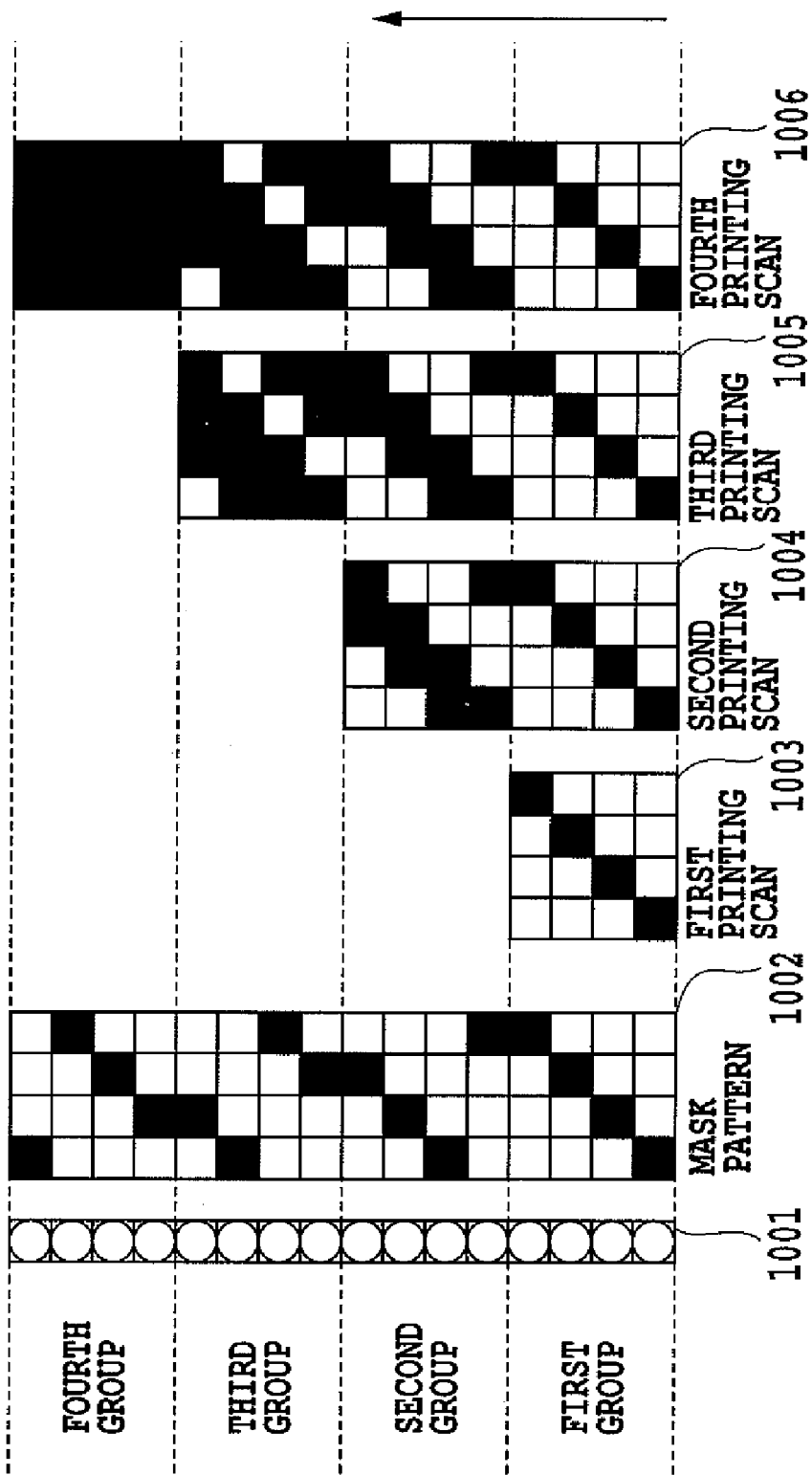
FIG. 1 is a schematic view of a printing head and a printing pattern for explaining multi-pass printing.

Considered is a case where such dot data is printed by use of a mask pattern having a unit of 1 area as shown in FIG. 1. Each of three printing areas arranged within each pixel (4 areas×2 areas) is printed with any of four printing scans. However, the above printing varies between pixels. Specifically, some printing areas in one pixel are separately printed, and others in one pixel are collectively printed. To be more specific, as described in the section of the related art, a situation occurs where two types of pixels each formed in m×n areas are mixed in one image. In one type of pixel, all dots within the pixel are printed at once. Printing of the other type of pixels is complete by separately printing dots several times. For this reason, color development and density in each of the pixels is unstable.

Meanwhile, in a case of printing by use of the mask pattern shown in FIG. 8, the three printing areas arranged within each pixel are printed by the same printing scan regardless of whether the dot arrangement pattern corresponding to each pixel is the pattern 901 or the pattern 902. Specifically, color development for the same gradation level is stable in all the pixels. For the above reason, in this embodiment, the mask pattern is determined by setting the region of 4 areas×2 areas which corresponds to the region of 1 pixel in the dot arrangement pattern, to be the cluster size.

Note that a mask pattern having a cluster size of more than 1 area has been disclosed in Japanese Patent Laid-Open No. 1994-22106 and the like. However, although the cluster described in Japanese Patent Laid-Open No. 1994-22106 includes a plurality of areas for accomplishing various other purposes, this cluster size does not have any relationship with the region of 1 pixel in the dot arrangement pattern. Specifically, by merely using the method disclosed in Japanese Patent Laid-Open No. 1994-22106 and the like, the effects of this embodiment described above (the effect of stabilizing color development of each pixel) cannot be achieved.

Meanwhile, the specification of U.S. Pat. No. 4,967,203 discloses the following contents. Specifically, a region equivalent to 1 pixel in the foregoing dot arrangement pattern is set to be one super pixel, and multi-pass printing is performed by a unit of the super pixel. According to the above document, while bleeding among dots within the super pixel is encouraged, bleeding among the super pixels should be avoided. Accordingly, in the same printing scan, no printing is performed for super pixels adjacent to each other. In a case where such super pixel corresponds to one pixel in the dot arrangement patterning processing according to the present invention, it is understood that a printing method using the mask pattern as shown in FIG. 8, for example, is similar to that in the specification of U.S. Pat. No. 4,967,203.

However, by having a second characteristic in addition to the first characteristic described above, the present invention provides a mask pattern different from that in the specification of U.S. Pat. No. 4,967,203. The second characteristic of the present invention is that individual clusters in the mask pattern are not periodically arranged. In the specification of U.S. Pat. No. 4,967,203, it is required that the super pixels adjacent to each other are not printed with the same printing scan. In order to meet the above requirement, dots printed in each printing scan are periodically arranged. Meanwhile, the inventors of the present invention have recognized that a mask pattern having no periodicity is more effective in obtaining smooth image quality than a mask pattern having periodicity. Accordingly, the inventors of the present invention have determined that, even if there is a spot, in the mask pattern, where clusters (pixels) adjacent to each other are printed at the same time, higher quality images can be obtained with the clusters not periodically arranged as compared with the case of using the mask pattern as disclosed in the specification of U.S. Pat. No. 4,967,203.

As described above, the object of the present invention is substantiated with the mask pattern in which the clusters having an integral multiple of m×n areas (m and n are positive integers, and at least one of m and n is an integer of 2 or larger) as a unit are non-periodically arranged. However, in this embodiment, a further-improved mask pattern is applied. Specifically, applied is a mask pattern which has no periodicity, and in which the individual clusters are arranged so as to have few low-frequency noise components, and to have a peak on a high-frequency side.

Figure 10:
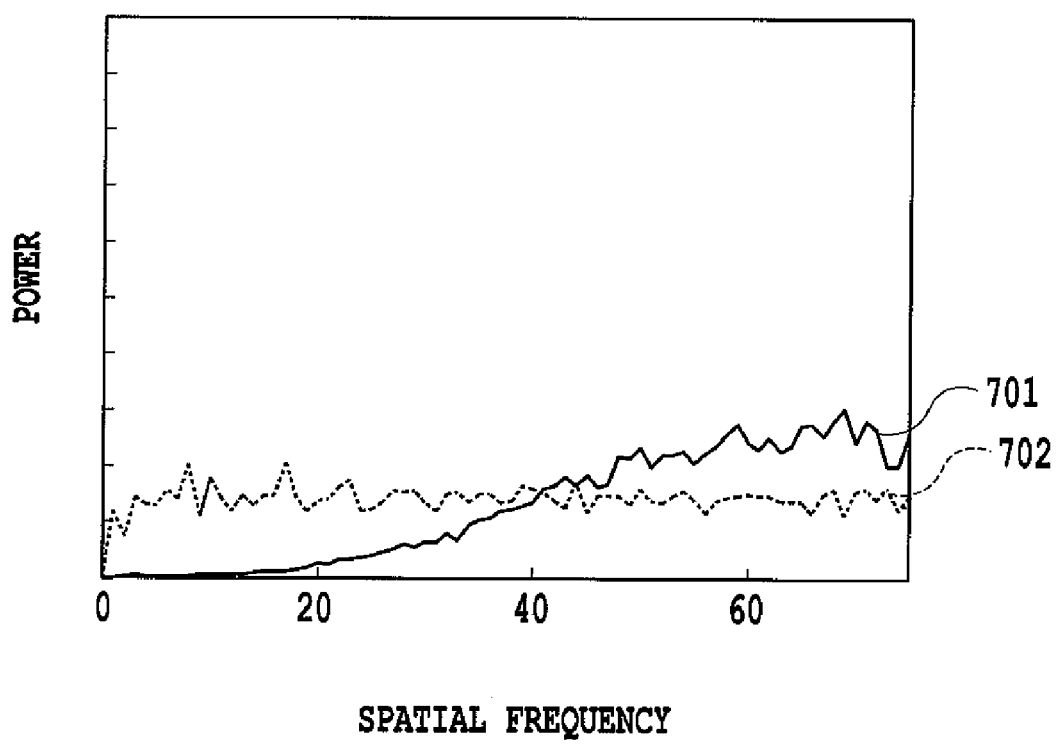
FIG. 10 is a graph of comparison between frequency characteristics of the mask pattern applied in the first embodiment of the present invention and frequency characteristics of a random mask.

FIG. 10 is a graph of comparison between frequency characteristics of the mask pattern of in FIG. 7 applied in this embodiment, and frequency characteristics of a random mask created also by setting 4 areas×2 areas to be the cluster size. In FIG. 10, the horizontal axis indicates spatial frequencies, and the vertical axis indicates power of the spatial frequencies. Reference numeral 701 denotes a power spectrum of the mask pattern in this embodiment, and reference numeral 702 denotes a power spectrum of the random mask pattern. According to the graph, it is apparent that the random mask pattern 702 has a virtually stable power spectrum in all of the spatial frequencies. Meanwhile, low-frequency components are suppressed in the mask pattern 701 used in this embodiment. Here, "a power spectrum" is indicative of "radially averaged power spectrum" which is described in "T. Mitsa and K. J. Parker, "Digital Halftorning using a blue Noise Mask", Proc. SPIE 1452, pp. 47-56(1991)", and which can treat two-dimensional space frequency as one-dimensional space frequency.

Additionally, "low-frequency components" indicates frequency components which exist in lower frequency region than average of spatial frequencies component. Meanwhile, "high-frequency components" indicates frequency components which exist in higher frequency region than average of spatial frequencies component. Furthermore, "low-frequency components is less than high-frequency components" is means that an integration value of frequency components which exist in lower frequency region is less than an integration value of frequency components which exist in higher frequency region.

The low-frequency components in the spatial frequencies are often detected as a sense of roughness when an image is inspected, and cause a smooth impression to be lost. Incidentally, even if the mask pattern having such low-frequency components is used, problems do not occur as long as the completing relationship among the printing positions in the respective printing scans is completely satisfied on the printing medium. However, it is inevitable that the individual printing scans include some shifts in the printing positions attributable to various mechanical errors. In this case, the design of the employed mask pattern is made visible, and image quality is deteriorated. On the other hand, it is made possible to obtain more stable image quality by using, as in this embodiment, the mask pattern having the design that gives a visually smooth impression, than by using the random mask pattern. The mask pattern which has few low-frequency components, and which has the peak on the high-frequency region side, such as that of this embodiment, can be created by use of the method described in Japanese Patent Laid-Open No. 2002-144552, for example.

Next, concrete descriptions will be given of the effect of the first characteristic in a case where a mask pattern having fewer low-frequency components than high-frequency components is used, that is, in a case where the second characteristic of the present invention is satisfied.

Figure 11:
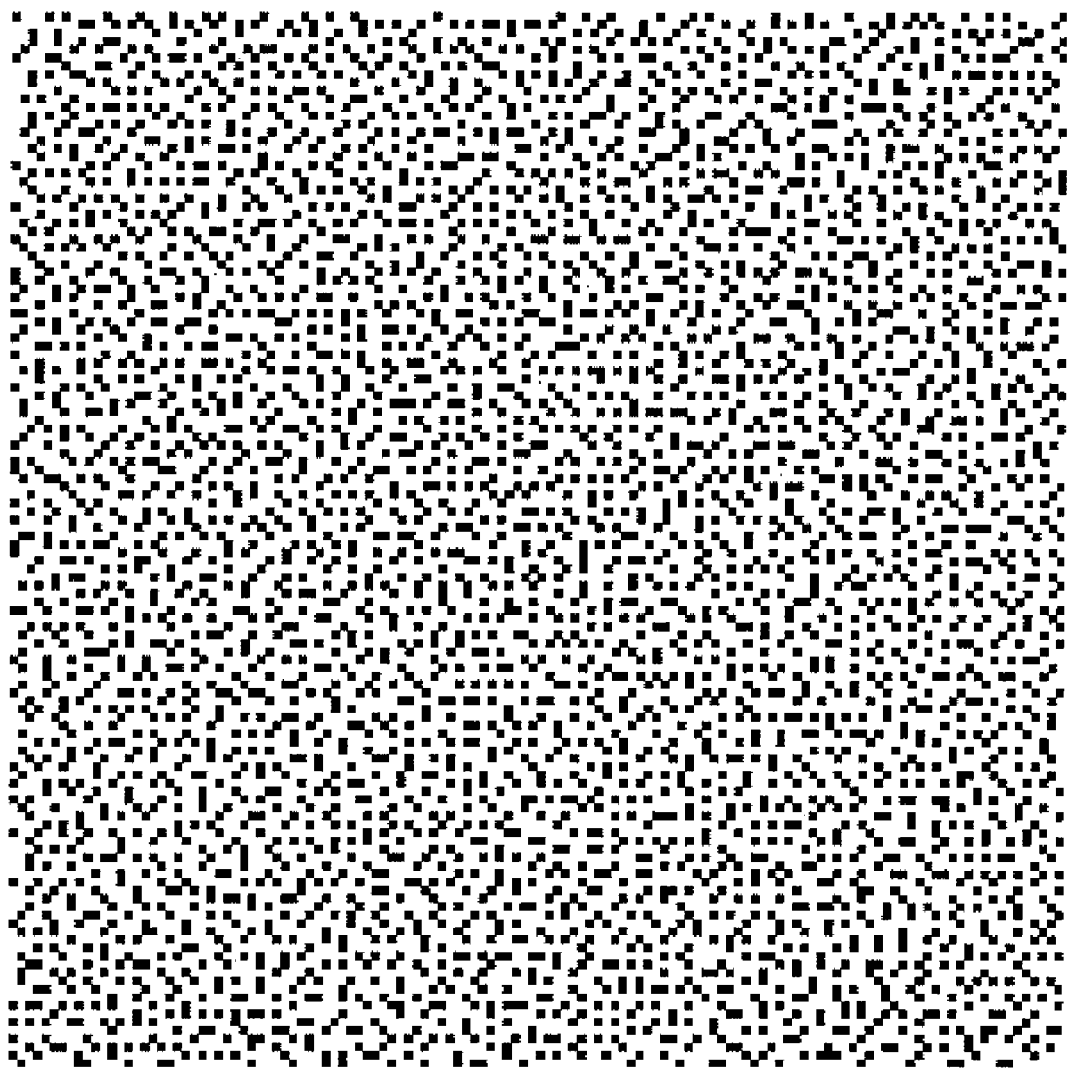
FIG. 11 shows a mask pattern in a case where a cluster size is set to be 1 area.

FIG. 11 shows a mask pattern in which a cluster size is set as 1 area for comparing this mask pattern with the mask pattern of this embodiment shown in FIG. 7. As in the case of FIG. 7, print permission areas are represented in black, and print non-permission areas are represented in white. When FIGS. 7 and 11 are compared with each other, while each of the cluster sizes are mutually different, the clusters in both mask patterns are arranged within 128 areas×128 areas in a state of having no low-frequency components.

Figure 12A:
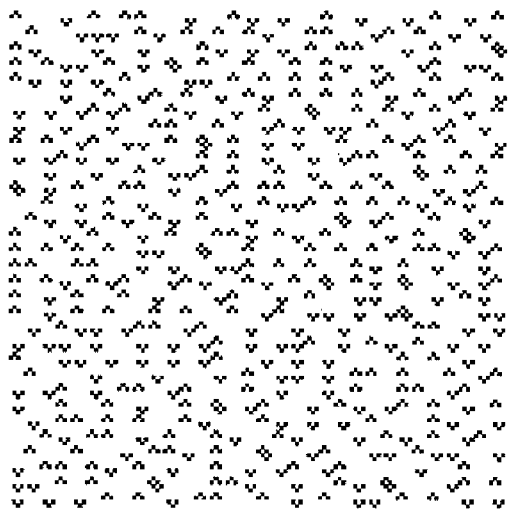
FIGS. 12A and 12B are views showing printing states when a dot pattern is printed by use of two kinds of mask patterns.
Figure 12B:
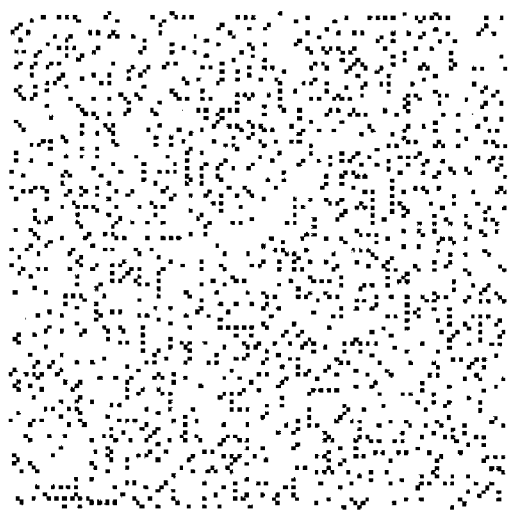

FIGS. 12A and 12B respectively show printing states in one scan at the time when the binarized dot pattern shown in FIG. 9 is printed by use of the foregoing two kinds of mask patterns. FIG. 12A shows a printing state at the time when the mask pattern of this embodiment shown in FIG. 7 is used. FIG. 12B shows a printing state at the time when the mask pattern shown in FIG. 11 is used. As is clear from comparison between FIGS. 12A and 12B, 3 areas in the cluster are concurrently printed when the mask pattern of this embodiment is used. The clusters of 3 areas are arranged as being much dispersed, and uniformity of the entire image is stable. Meanwhile, in the printing state shown in FIG. 12B, the individual areas are printed as being relatively dispersed. However, a more macro observation makes it apparent that crudeness is caused among the dot printing positions. Specifically, the effect of the mask pattern, which is suppression of the low-frequency components, is not sufficiently achieved.

Such a phenomenon is caused by the fact that the cluster size is set regardless of each pixel in the dot arrangement pattern. In other words, even the highly-dispersed mask pattern, in which the low-frequency components are suppressed, cannot sufficiently achieve its characteristics at the time of printing unless a unit of the cluster size is set to be 1 pixel region of the dot arrangement pattern as a unit.

As described above, the employed mask pattern in this embodiment is that in which a plurality of areas having the same size as the dot arrangement pattern are set to be the cluster size, and in which the clusters are non-periodically arranged so as to have no low-frequency components. Thus, density and color development within each pixel are stabilized. Moreover, uniform and high-definition image quality with few low-frequency components can be obtained.

(Second Embodiment)

A second embodiment of the present invention will be described below. In this embodiment, the printing system shown in FIGS. 3 to 5 is used and the dot arrangement patterns shown in FIG. 6 are adopted, as in the case of the first embodiment.

In the first embodiment, the description has been given of the relationship between the dot arrangement pattern and the mask pattern concerning ink in one color such as black ink, for example. Meanwhile, in this embodiment, a relationship among colors will also be described. Moreover, dot arrangement patterns and mask patterns, which are provided for each ink color are prepared in order to more actively reduce adverse effects on images attributable to grains, in particular, caused on a printing medium.

The grains will be briefly described below. In the recent ink jet printing system, there has been a significant increase in density of printing elements (nozzles) and in an ejection frequency. Moreover, variety of ink types is increasingly diverse. Accordingly, an amount of ink applied onto a unit area of a printing medium per unit time has been increased. Under such circumstances, a speed of absorption of the ink cannot sufficiently correspond to a speed of application of the ink on some printing media. To be more specific, a plurality of applied ink droplets come into contact with one another, and is mixed on a surface of the printing medium before absorption. As a result, this phenomenon causes a problem with an image. The ink droplets printed in same position or neighborhood positions on the printing medium form a large cluster by attracting one another with surface tensions thereof in a case where droplets are not absorbed into the printing medium quickly. Such a cluster is referred to as a grain in the present specification. Once such a grain is generated, an ink droplet applied in the same position or a neighborhood position is more likely attracted to the grain. In other words, the initially-generated grain becomes a core, and gradually grows to be a large grain.

Even if such grains are formed, the grains do not cause much trouble with the image as long as the grains of the same color generated in the clusters are arranged as being much dispersed, for example, as shown in FIG. 12A described in the first embodiment. However, in a case where two or more colors of ink are applied to the same pixel for representing blue, red or green, when those inks are all applied approximately at the same time, grains formed in this event become larger and more visible.

In order to suppress such grains of different colors, an effective method is one for providing mask patterns in which print permission areas are arranged differently from each color. This is because adoption of such a method makes it possible to control the dots of the respective colors in the same printing scan so that the dots are printed in positions as different from one another as possible. However, in a recent situation where variety of ink types is diverse and the number of passes of multi-pass printing tend to be reduce, it is difficult to control the printing positions of dots of the respective colors in the same printing scan so as to be excluded by each other completely. There are not a few portions in which different color dots are printed overlapping one another. Then, not a few grains of different colors ink are generated.

However, the inventors of the present invention have already confirmed that, even if the grains of different colors as described above exist, the grains do not cause significant adverse effects on images as long as the grains are arranged as being much dispersed. In the other hand, it is also confirmed that, if the grains are arranged as not being much dispersed, an adverse effect known as beading occurs on the image. In consideration of such circumstances, Japanese Patent Laid-Open No. 2006-44258 discloses a configuration of a mask pattern and a method of forming thereof for arranging, as being much dispersed, grains inevitably formed with a plurality of types of ink.

However, Japanese Patent Laid-Open No. 2006-44258 does not focus on an interference between the dot arrangement patterning processing and the mask pattern, which is a concern in the present invention. For this reason, in the above patent document, the mask patterns for the respective colors are merely set up so as to basically arrange the grains as being much dispersed, while setting, as a unit, 1 area×1 area or the cluster which is irrelevant to 1 pixel region of the dot arrangement pattern. As a result, in parts where a secondary or more colors are mixed, the problem as described with reference to FIG. 12B still remains unsolved.

In this embodiment, adopted is a configuration including the characteristics of the mask pattern disclosed in Japanese Patent Laid-Open No. 2006-44258 in addition to the first and second characteristics of the present invention described in the first embodiment. Specifically, mask patterns for respective colors are designed so that the grains formed of clusters of the respective colors overlapping one another would be arranged non-periodically and little having low-frequency components while setting, as a cluster size, a plurality of areas having the integral multiple size as a dot arrangement pattern. In other words, the arrangement of print permission areas in mask patterns for respective colors are designed so that a pattern which obtained by a logical product (AND operation) of mask patterns for respective colors would be non-periodically and would have low-frequency components less than high-frequency components. Such a mask pattern can be formed by adopting the method described in Japanese Patent Laid-Open No. 2006-44258 while setting, for example, 4 areas×2 areas to be one cluster. In this embodiment, by use of the thus formed mask pattern, density and color development within each pixel can be stabilized. Also in an image in which the secondary or more colors are mixed, it is possible to obtain high-definition image quality in which beading is suppressed. Especially, by foregoing construction, positions in which beading tends to be generated, that is, a positions in which clusters of the respective colors are overlapping one another, are dispersed favorably. Therefore, even if beading is generated, it is inconspicuous visually.

Note that the above description has been given of the configuration in which data processing is executed at the same resolution and in which the dot arrangement patterns having the same area size (4 areas×2 areas) are used, for each of the colors, as shown in FIGS. 5 and 6. However, the effects of the present invention are not limited to those described above. The present invention can be effectively utilized even in a case where the data processing is executed at a different resolution and where a dot arrangement pattern having a size different for only a predetermined ink among the plurality of ink colors.

Figure 18:
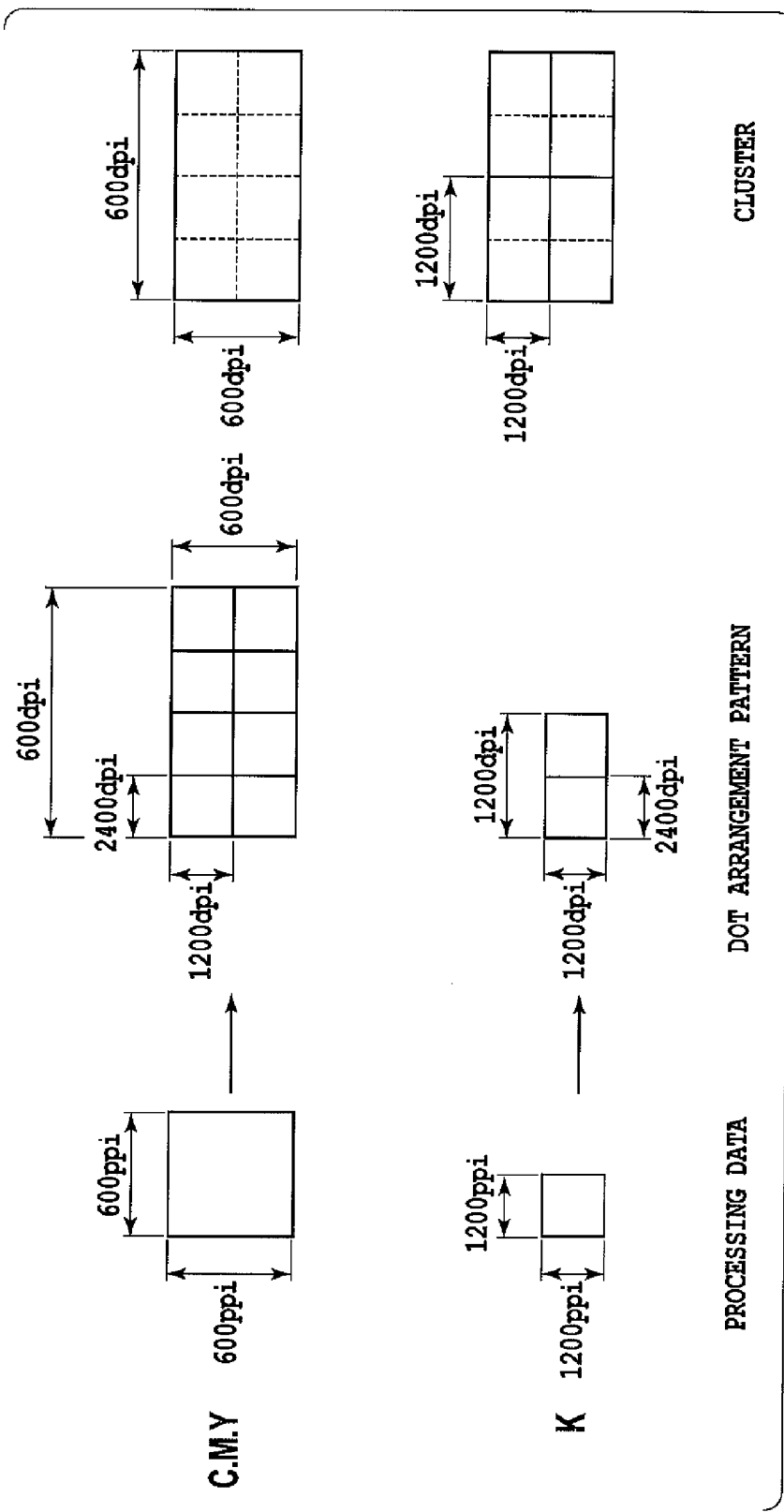
FIG. 18 is a schematic view for explaining an example of using a dot arrangement pattern having a different size for black from that of other colors in a second embodiment.

FIG. 18 is a schematic view for explaining an example of using a dot arrangement pattern with a size for black different from that of the other colors. Here, FIG. 18 shows a case where data of the three colors, which are cyan, magenta and yellow, are processed at a resolution of 600 ppi as in the case of the foregoing embodiment, and where only data on black is processed at a resolution of 1200 ppi. Moreover, the printing resolution of the printing apparatus is supposed to be 2400 dpi in the main scanning direction and 1200 dpi in the sub-scanning direction for all of the colors. In such a case, dot arrangement patterns of 4 areas×2 areas are applied to cyan, magenta and yellow as in the case of FIG. 6. Meanwhile, a dot arrangement pattern of 2 areas×1 area is applied to black. Specifically, a mask pattern having 2 areas×1 area as a cluster may be prepared for black.

However, in this case, it is also possible to set a cluster size to be 4 areas×2 areas for black. In such a case, the dot arrangement patterns for 4 pixels (2 in height×2 in width) are arranged in each of the clusters. As long as the clusters, each for 4 pixels, are non-periodically arranged within the mask pattern, the effects of the present invention can be achieved.

In the present invention, the cluster size needs not to correspond to 1 pixel region of the dot arrangement pattern. The cluster size may have a size that allows an integer number of dot arrangement patterns to be arranged both in the main scanning direction and in the sub-scanning direction. The present invention is effective as long as each of the mask patterns including such clusters arranged non-periodically is used. This holds true not only for this embodiment but also for the entirety of the present invention.

(Third Embodiment)

A third embodiment of the present invention will be described below. In this embodiment, the printing system shown in FIGS. 3 to 5 is used, and the dot arrangement patterns shown in FIG. 6 are adopted, as in the case of the foregoing embodiments. Note, however, that column thinning printing is carried out in each printing scan in this embodiment.

Figure 13:
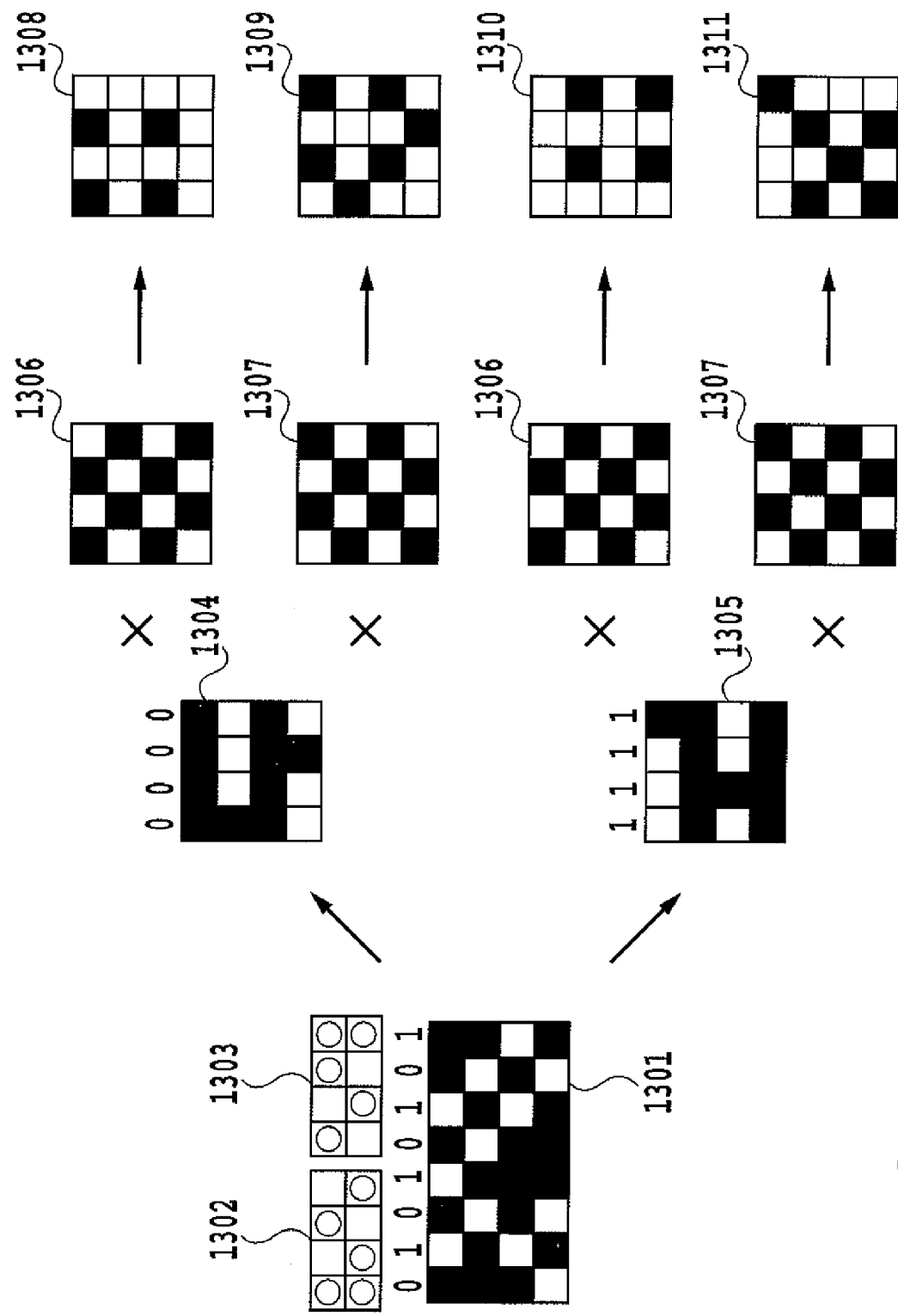
FIG. 13 is a schematic view for explaining column thinning printing.

FIG. 13 is a schematic view for explaining the column thinning printing. The column thinning printing is a printing method for printing binary data arranged in the main scanning direction while thinning pieces of the data at predetermined intervals. Here, FIG. 13 shows a case where every other column data is alternately printed. Reference numeral 1301 denotes a dot pattern in a state after a region of 4 pixels (8 areas×4 areas), in which data of level 5 is inputted, is processed by use of dot arrangement patterns 1302 and 1303. 0s and 1s shown above the pattern 1301 represent column numbers. Columns 0 and columns 1, which are alternately arranged, are printed in different printing scans. Reference numeral 1304 denotes a dot pattern formed by collecting only the columns 0, and reference numeral 1305 denotes a dot pattern formed by collecting only the columns 1.

Considered is a case where the data of the respective columns are printed by divided parts with 2-pass mask patterns such as 1306 and 1307 while performing the column thinning as described above. In this event, dot patterns printed in the respective printing scans are as those denoted by 1308 to 1311. As a result, the same printing operation as that of 4-pass printing is performed. However, in a case where the column thinning printing is performed, a drive frequency for ejecting ink from each of the nozzles can be set in accordance with a cycle of the printing columns. As a result, a main scanning speed, of which upper limit is set by the drive frequency, can be further increased. Moreover, even in the same 4-pass printing, an image can be outputted at higher speed when the column thinning printing is simultaneously used.

This embodiment is characterized in that, even when the multi-pass printing is performed for the dot patterns, such as

1304 and 1305, which are divided for each column, a mask pattern, which is printed with 1 pixel region of the dot arrangement pattern as one unit, is prepared.

Figure 14:
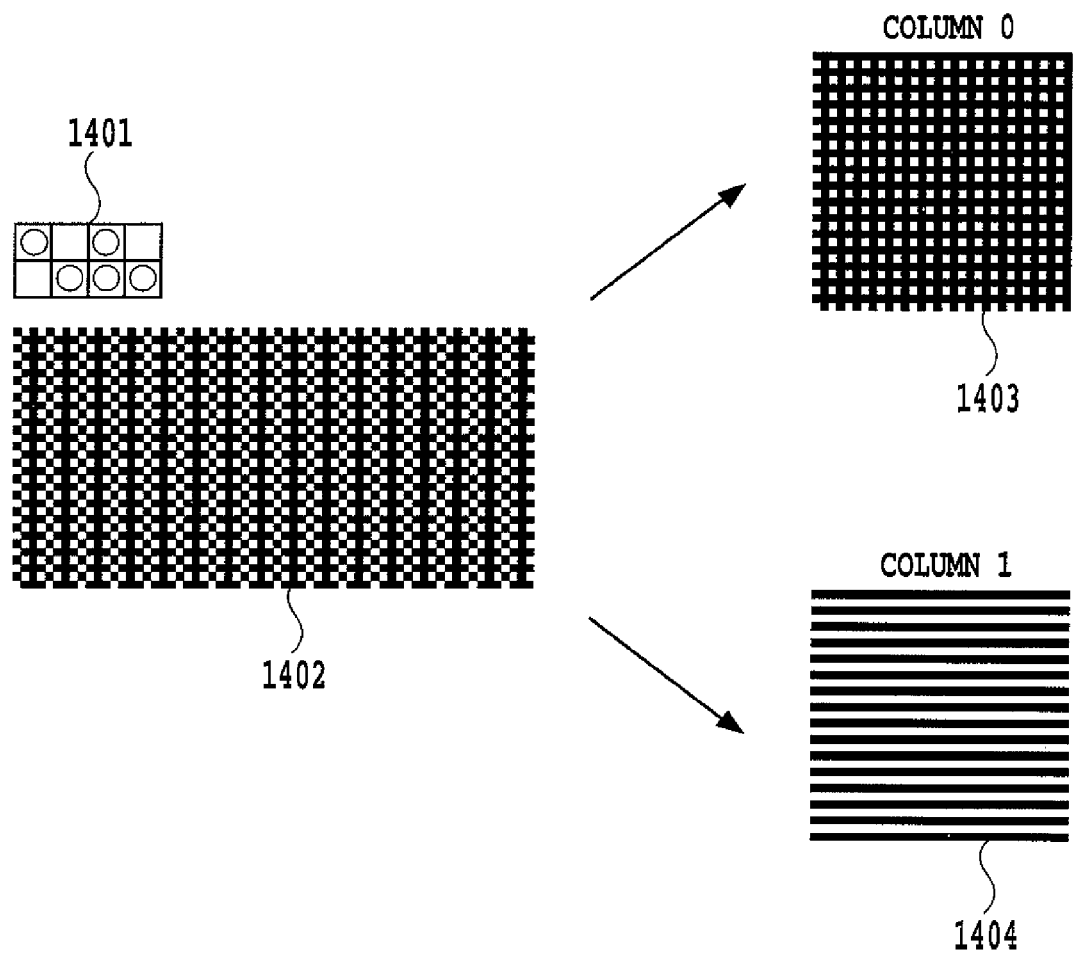
FIG. 14 is a view showing a state where dot data corresponding to a uniform level is divided into two columns.

FIG. 14 shows dot data in a case where data of level 5 are uniformly inputted, and where a dot arrangement pattern 1401 is used for all of the pixels. FIG. 14 also shows dot data in a state after the above dot data is divided into columns 0 and columns 1. In FIG. 14, reference numeral 1402 denotes dot data in a case where the dot arrangement pattern 1401 is applied to all of the pixels in which the data of level 5 are uniformly inputted. Moreover, reference numerals 1403 and 1404 denote dot data in a state after the dot data 1402 is divided into the columns 0 and the columns 1. In this embodiment, for such dot data 1403 and 1404, a mask pattern in which a cluster having 2 areas×2 areas is set as a unit, and in which the clusters are arranged as being much dispersed, is used.

Figure 15:
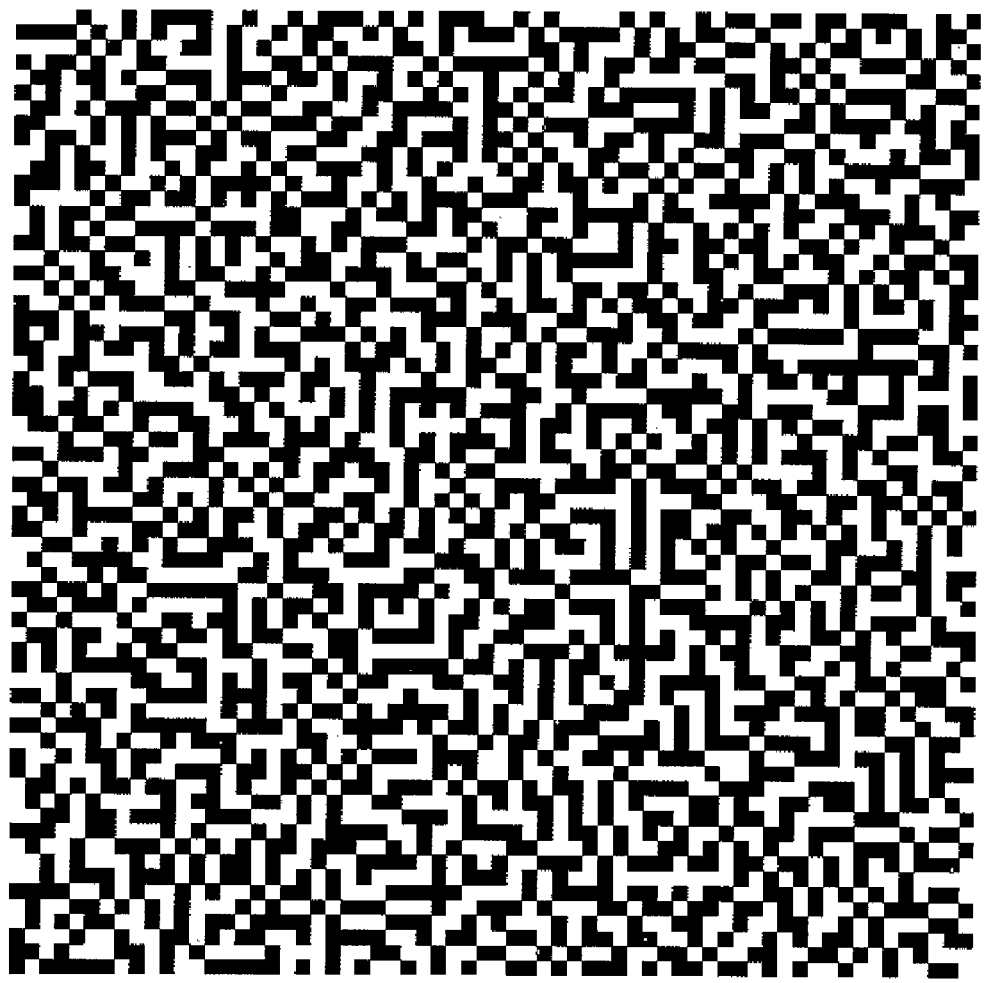
FIG. 15 is a view showing a mask pattern used in a third embodiment of the present invention.

FIG. 15 is a view showing a mask pattern used in this embodiment. As in the case of the first embodiment, the mask pattern is formed of 128 areas in the vertical direction×128 areas in the horizontal direction, and the number of areas in the vertical direction corresponds to the number of nozzles in the printing head. The mask pattern of this embodiment is for further dividing, in two, the dot data divided in two with the column thinning. Thereby, a thinning rate (printing permission rate) is set at 50%.

In FIG. 15, the cluster size is set to be 2 areas×2 areas. Accordingly, printing in which a region of 4 areas×2 areas is set to be one unit is achieved on the printing medium. Furthermore, since the individual clusters are arranged as being much dispersed, the same effects as those of the foregoing embodiment can also be achieved in this embodiment where the column thinning printing is performed.

Although the column thinning for dividing each of the columns in two has been described above, the number of divisions for the column thinning is not limited to the above. For example, it is also possible to perform printing by dividing each of the columns into four parts, 0 to 3. In this case, when each piece of the thus divided column data is further divided by use of a 2-pass mask pattern, the same printing operation as that of 8-pass printing is performed as a result. Here, in order to substantiate printing in which a region of 4 areas×2 areas, on the printing medium, is set to be one unit, the cluster size may be set to be 1 area×2 areas as one unit.

(Fourth Embodiment)

A fourth embodiment of the present invention will be described below. In this embodiment, the printing system shown in FIGS. 3 to 5 is used, and the dot arrangement patterns shown in FIG. 6 are adopted, as in the case of the embodiments described above. Note, however, that two arrays of nozzles each of which ejects a predetermined ink color, are prepared in this embodiment.

Figure 16:
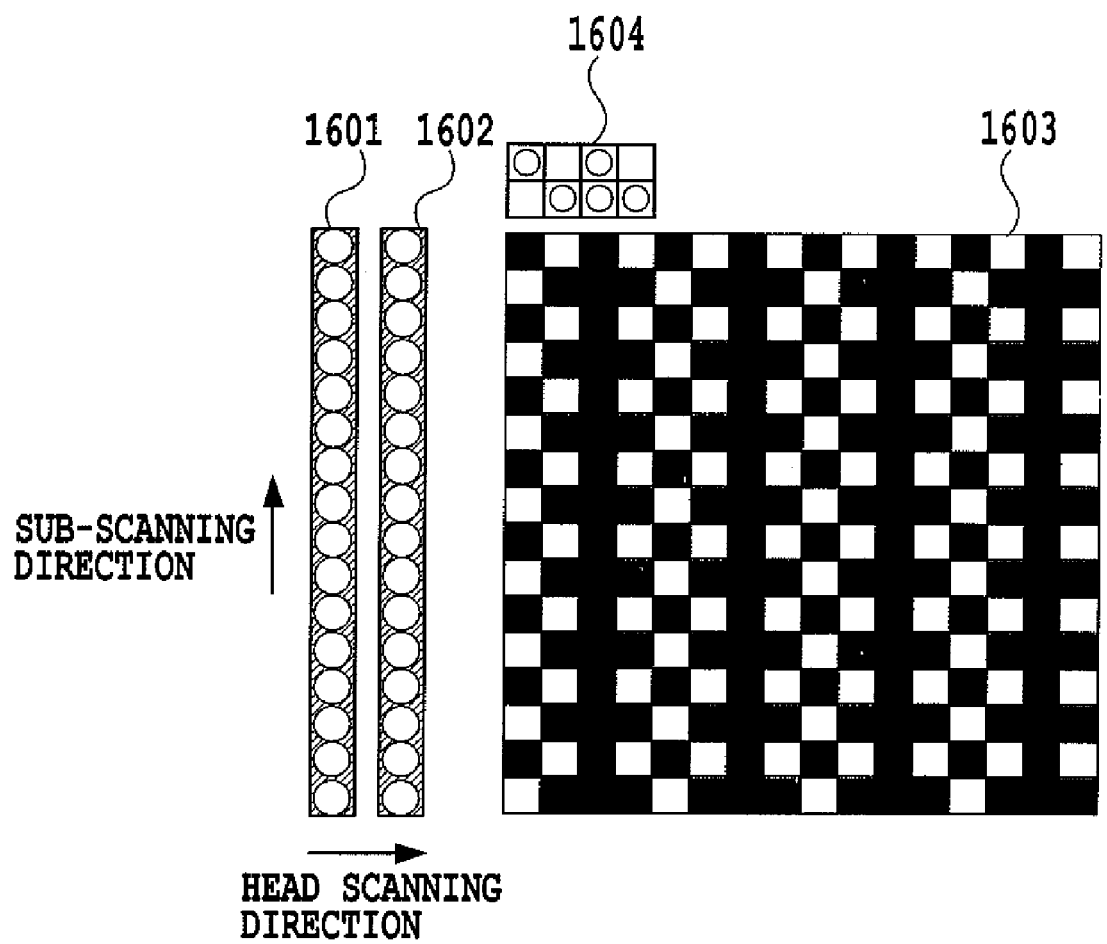
FIG. 16 is a schematic view for explaining a relationship between a printing head and dot data, which are used in a fourth embodiment of the present invention.

FIG. 16 is a schematic view for explaining a relationship between a printing head which is used in this embodiment and dot data. Each of reference numerals 1601 and 1602 denotes a nozzle array ejecting the same color of ink. In the printing head of this embodiment, 128 nozzles are actually arranged in each of the nozzle arrays. In this event, however, for simplicity, 16 nozzles are arranged in the sub-scanning direction in each of the arrays. In FIG. 16, the two nozzle arrays are disposed adjacent to each other. However, actual nozzle arrays maybe disposed with nozzle arrays of other colors interposed therebetween, or maybe disposed in a state of being shifted and separated from each other in the sub-scanning direction. The two nozzle arrays may be formed in the same printing head or on the same substrate. Alternatively, the nozzle arrays may be formed in different printing heads or on different substrates.

In FIG. 16, reference numeral 1603 denotes binary dot data to be printed by any one of the two nozzle arrays 1601 and 1602. This dot data is obtained as a result of uniformly inputting data of level 5 in each of the pixels of 600 ppi, and of using a dot arrangement pattern 1604 for all of the pixels. The mask pattern as described above is applicable also in a case where such binary dot data is printed by parts divided for the two nozzle arrays 1601 and 1602.

Figure 17:
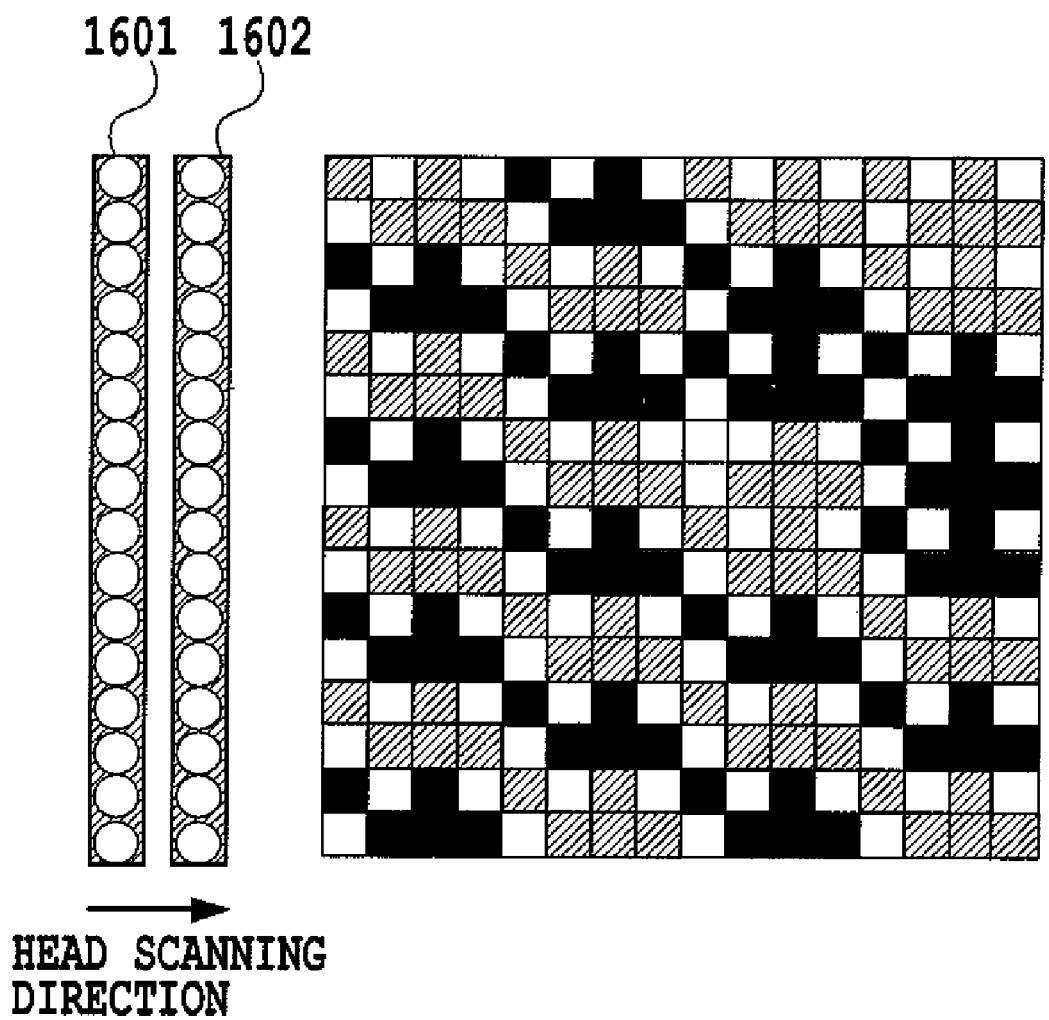
FIG. 17 is a schematic view for explaining a relationship between a mask pattern and a dot arrangement pattern according to the fourth embodiment.

FIG. 17 is a schematic view for explaining a relationship between a mask pattern and a dot arrangement pattern according to this embodiment. In FIG. 17, shaded areas are those printed with the nozzle array 1601, and black areas are those printed with the nozzle array 1602. As is clear from FIG. 17, in this embodiment, a mask pattern is formed by using 1 pixel region in dot arrangement patterning processing as one cluster, each pixel region corresponding to 4 areas×2 areas. Thereby, dot data to be printed with each of the two nozzle arrays are determined. Moreover, in the mask pattern, each of the clusters is non-periodically arranged.

As described above, even in a case where printing of the same dot data is shared by two or more nozzle arrays, the same effects as those of the above-described multi-pass printing can be achieved. A data processing method of the present invention is effective also in this embodiment.

In the embodiments described above with reference to FIGS. 3 to 5, the description has been given of the entire image processing from image generation by application software to mask data conversion processing being carried out in the host device (a data supply device). However, the present invention is not limited to the above. For example, dot arrangement patterns and mask patterns may be stored in a memory of the printing apparatus, and the host device may be caused to carry out the image processing up to half-toning. In this case, the printing apparatus functions as a data processor of the present invention. Furthermore, the entire processing described above may be executed by one device. Any dot arrangement patterning processing and the mask data conversion processing are included in the scope of the present invention as long as the data processing method having the aforementioned characteristics is adopted.

Furthermore, the scope of the present invention also includes a configuration in which software for substantiating functions handled by a computer or a program code of a printer driver is supplied to the computer, and in which the computer is then operated with the program code stored therein. In this case, the program code itself achieves a new function of the present invention. Thus, the program code itself and means for supplying the program code to the computer through communication, a storage medium or the like, are also included in the scope of the present invention.

As the storage medium for supplying the program code, it is possible to use, for example, a hard disk, an optical disk, a magneto-optical disk, a CD-R, a DVD, a magnetic tape, a nonvolatile memory card, a ROM and the like, besides a flexible disk and a CD-ROM.

The scope of the present invention also includes a case where the functions of the embodiments of the present invention are substantiated by the OS or the like operated on the computer executes a part of, or the entire actual processing on the basis of an instruction of the program code read by the computer.

Furthermore, it is also possible to adopt such a configuration in which the program code read from the storage medium is written into a memory included in a function extension board inserted into the computer or in a function extension unit connected to the computer. In this case, the functions of the embodiments of the present invention are substantiated by a CPU or the like included in the function expanded board or in the function expanded unit carrying out a part of, or the entire actual processing on the basis of an instruction of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-108905, filed Apr. 11, 2006, which is hereby incorporated by reference herein in its entirety.

What is claimed is:

1. A data processor which generates binary data used for printing in a plurality of pixel regions of a printing medium by a plurality of scans of a printing head respectively comprising:
   converting means which converts multiple data corresponding to each of the pixel regions into a first binary data corresponding to m×n areas (m and n indicate positive integers, and at least one of m and n is an integer of 2 or larger) forming the pixel region; and
   generating means which generates a second binary data used in each of the plurality of scans, by use of the first binary data corresponding to a plurality of m×n areas obtained by said converting means and a mask pattern in which print permission areas and print non-permission areas are arranged for each of a plurality of scans respectively,
   wherein the mask pattern includes two print permission parts each of which corresponds to (an integral multiple of m)×(an integral multiple of n) areas, and the two print permission parts are arranged at a distance of m or n areas from each other.

2. The data processor according to claim 1, wherein arrangement of the print permission areas in the mask pattern has characteristics that low-frequency components are fewer than high-frequency components.

3. The data processor according to claim 1, wherein a plurality of types of mask patterns different from each other are prepared for a plurality of types of dots which can be printed with the printing head.

4. The data processor according to claim 3, wherein a pattern obtained by a logical product of the plurality of types of mask patterns has a characteristic that low-frequency components are fewer than high-frequency components.

5. The data processor according to claim 1, wherein the data processor is a printing apparatus which carries out printing by use of the printing head on the basis of the second binary data.

6. The data processor according to claim 1, wherein the data processor is a data supply device which is connected to a printing apparatus for carrying out printing by use of the printing head on the basis of the second binary data, and supplies the second binary data to the printing apparatus.

7. A data processing method performed by a data processor for dividing first binary data to be printed in one region on a printing medium into second binary data used in each of a plurality of scans of a printing head, in order to perform printing in the same region with the plurality of scans, the method comprising the step of:
   dividing the first binary data obtained by binarization using a dot arrangement pattern formed of m×n areas (m and n indicate positive integers, and at least one of m and n is an integer of 2 or larger) into the second binary data used in the plurality of scans, by use of a mask pattern which includes two print permission parts each of which corresponds to (an integral multiple of m)×(an integral multiple of n) areas and the two print permission parts are arranged at a distance of m or n areas from each other.

8. The data processing method according to claim 7, wherein arrangement of the print permission areas in the mask pattern has characteristics that low-frequency components are fewer than high-frequency components.

9. The data processing method according to claim 7, wherein a plurality of types of mask patterns different from each other are prepared for a plurality of types of dots which can be printed with the printing head.

10. The data processing method according to claim 9, wherein a pattern obtained by a logical product of the plurality of types of mask patterns has a characteristic that low-frequency components are fewer than high-frequency components.

11. The data processing method according to claim 7, wherein the data processor is a printing apparatus which carries out printing by use of the printing head on the basis of the second binary data.

12. The data processing method according to claim 7, wherein the data processor is a data supply device which is connected to a printing apparatus for carrying out printing by use of the printing head on the basis of the second binary data, and supplies the second binary data to the printing apparatus.

13. A non-transitory computer-readable medium storing program data for a processing method performed by a data processor for dividing first binary data to be printed in one region on a printing medium into second binary data used in each of a plurality of scans of a printing head in order to perform printing in the same region with the plurality of scans, the method comprising the step of:
   dividing the first binary data obtained by binarization using a dot arrangement pattern formed of m×n areas (m and n indicate positive integers, and at least one of m and n is an integer of 2 or larger) into the second binary data used in the plurality of scans, by use of a mask pattern which includes two print permission parts each of which corresponds to (an integral multiple of m)×(an integral multiple of n) areas and the two print permission parts are arranged at a distance of m or n areas from each other.

* * * * *